US012756992B1

(12) United States Patent
Nugiel et al.

(10) Patent No.: US 12,756,992 B1
(45) Date of Patent: Oct. 6, 2026

(54) REMOTE CONTROL VIA SHORT MESSAGE SERVICE (SMS) COMMANDS

(71) Applicant: SimpliSafe, Inc., Boston, MA (US)

(72) Inventors: Molly Nugiel, Somerville, MA (US); Matthew Hosking, Boston, MA (US); Ruth Hill, Belmont, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/421,804

(22) Filed: Dec. 16, 2025

(51) Int. Cl.
*H04W 4/14* (2009.01)
*G08B 13/22* (2006.01)

(52) U.S. Cl.
CPC .............. *H04W 4/14* (2013.01); *G08B 13/22* (2013.01)

(58) Field of Classification Search
CPC ................................. H04W 4/14; G08B 13/22
See application file for complete search history.

(56) References Cited

U.S. PATENT DOCUMENTS

| | | | | |
|---|---|---|---|---|
| 7,312,712 | B1 * | 12/2007 | Worrall | G08B 21/02 379/38 |
| 7,817,029 | B1 | 10/2010 | Hillenburg | |
| 8,489,065 | B2 | 7/2013 | Green | |
| 11,100,590 | B1 * | 8/2021 | Baker | G08B 25/008 |
| 11,402,812 | B1 * | 8/2022 | Fitzgibbon | G05B 15/02 |
| 12,073,706 | B1 | 8/2024 | Rajkovic et al. | |
| 12,379,827 | B2 | 8/2025 | Klimczak | |
| 2002/0177428 | A1 * | 11/2002 | Menard | G08B 29/24 455/466 |
| 2006/0145841 | A1 | 7/2006 | Daurensan | |
| 2006/0227001 | A1 | 10/2006 | Petricoin | |
| 2008/0221743 | A1 * | 9/2008 | Schwarz | G06Q 30/06 701/2 |
| 2012/0268267 | A1 | 10/2012 | Anderson | |
| 2012/0282974 | A1 | 11/2012 | Green | |
| 2017/0134895 | A1 | 5/2017 | Rabb | |
| 2018/0130335 | A1 * | 5/2018 | Jedwab | G08B 13/19654 |
| 2020/0374682 | A1 * | 11/2020 | Newman | H04W 12/06 |
| 2021/0280050 | A1 | 9/2021 | Trundle | |

(Continued)

FOREIGN PATENT DOCUMENTS

WO 9816412 A1 4/1998

OTHER PUBLICATIONS

"What are Alarm Texts and how do I use them?", https://simplisafe.com/alarmtexts, accessible as of Oct. 28, 2022.

(Continued)

*Primary Examiner* — Charles N Appiah
*Assistant Examiner* — Frank E Donado
(74) *Attorney, Agent, or Firm* — Pierce Atwood LLP

(57) ABSTRACT

A computing system may cause transmission of a prompt, formatted as a short message service (SMS) message, to an endpoint device, the prompt indicating an ability to control one or more components a location remote from the computing system. The computing system may receive text of a responsive SMS message sent by the endpoint device and determine that the text of the responsive SMS message represents a request to control the one or more components. The computing system may cause the one or more components to change state based at least in part on the text of the responsive SMS message representing the request to control the one or more components.

18 Claims, 9 Drawing Sheets

(56) References Cited

U.S. PATENT DOCUMENTS

| | | | |
|---|---|---|---|
| 2022/0198913 | A1 | 6/2022 | Thompson |
| 2025/0259530 | A1 | 8/2025 | MacDonald et al. |

OTHER PUBLICATIONS

"What are Alarm Texts and how do I use them?", https://simplisafe.com/alarmtexts, accessible as of Jun. 1, 2023.
"What are Alarm Texts and how do I use them?", https://simplisafe.com/alarmtexts, accessible as of Dec. 13, 2023.
"What are Alarm Texts and how do I use them?", https://simplisafe.com/alarmtexts, accessible as of Mar. 1, 2024.
"Alarm Texts for your SimpliSafe® System", https://simplisafe.com/alarmtexts, accessible as of Sep. 4, 2024.
U.S. Appl. No. 19/335,610, filed Sep. 22, 2025.
"Alarm Texts for your SimpliSafe@ System", https://simplisafe.com/alarmtexts, accessible as of Oct. 28, 2024.

* cited by examiner

138

| Phone Number (140) | Name (141) | Address (142) | Event Type (143) | Time Window Indicator (144) |
|---|---|---|---|---|
| PN1 | N1 | A1 | ET1 | TWI1 |
| PN2 | N2 | A2 | ET2 | TWI2 |
| PN3 | N3 | A3 | ET3 | TWI3 |
| PN4 | N4 | A4 | ET4 | TWI4 |

FIG. 1B

REMOTE CONTROL VIA SHORT MESSAGE SERVICE (SMS) COMMANDS

TECHNICAL FIELD

Aspects of the technologies described herein relate to systems and methods useful in remotely controlling devices in buildings and other physical structures.

BACKGROUND

Systems of computerized devices that provide various benefits are present in many modern buildings. Examples of these systems include monitoring systems, environmental control systems, and access control systems, to name a few types of systems. For instance, some monitoring systems use one or more cameras to capture images of areas around or within a residence, business location, or other physical structure. Such systems can process images locally and transmit the captured images to a remote service. If motion is detected, the systems can send an alert to one or more devices. Environmental control systems may include smart thermostats, switches, or lighting that can be programmed to adjust settings based on time of day, day of week, or according to other schedules. Access control systems can be utilized to lock or unlock latches and open or close doors based on a variety of inputs. Moreover, many monitoring, environmental control, and access control systems can be remotely controlled. The benefits provided by these systems include information-rich telemetry, power conservation, and enhanced convenience for occupants and visitors.

SUMMARY

This disclosure is directed to systems and techniques for remotely controlling one or more devices via SMS messaging.

In some aspects, the techniques described herein relate to a method including: causing, by a computing system, transmission of a prompt, formatted as a short message service (SMS) message, to an endpoint device, the prompt indicating an ability to control at least one component at a location remote from the computing system; receiving, by the computing system, text of a responsive SMS message sent by the endpoint device; determining, by the computing system, that the text of the responsive SMS message represents a request to control the at least one component; and causing, by the computing system, the at least one component to change state based at least in part on the text of the responsive SMS message representing the request to control the at least one component.

In some aspects, the techniques described herein relate to a computing system including: one or more processors; and one or more computer-readable mediums encoded with instructions which, when executed by the one or more processors, cause the computing system to: cause transmission of a prompt, formatted as a short message service (SMS) message, to an endpoint device, the prompt indicating an ability to control at least one component at a location remote from the computing system; receive text of a responsive SMS message sent by the endpoint device; determine that the text of the responsive SMS message represents a request to control the at least one component; and cause the at least one component to change state based at least in part on the text of the responsive SMS message representing the request to control the at least one component.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 1B is a table showing example data that may be stored and used by components of the SMS service shown in FIG. 1A, in accordance with some implementations of the present disclosure.

DETAILED DESCRIPTION

Figure 1A:
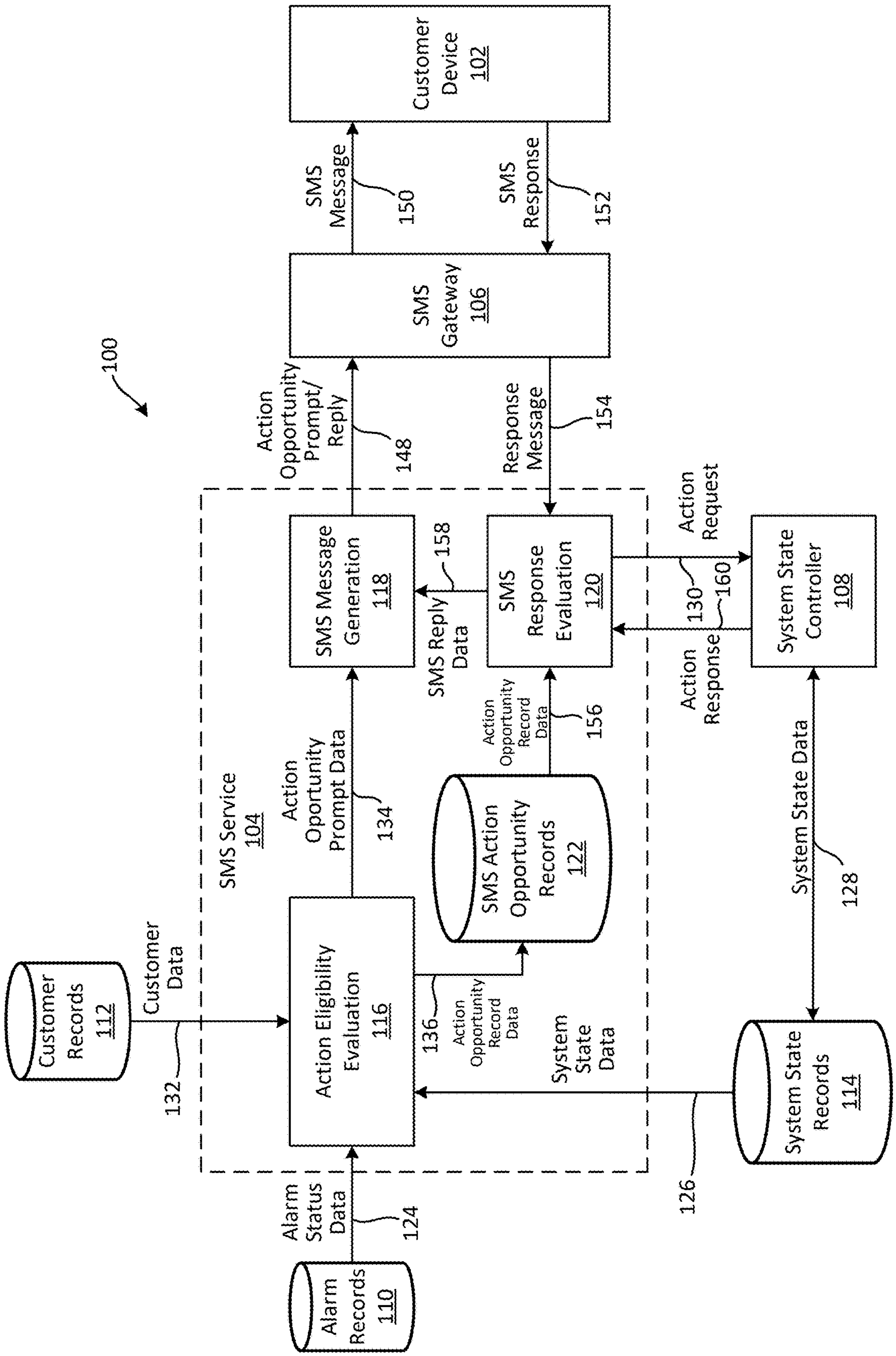
FIG. 1A is an example system configured to enable an end user to remotely control a system via an SMS message, in accordance with some implementations of the present disclosure.

In existing security systems, customers who experience alarm events (e.g., a burglary alarm) generally have limited options for disarming their security systems while they are away from their residence or other property. The primary methods available are physical interaction with a keypad or key fob at the premises, which are unhelpful in situations when users are remote from their systems, or using an application on an endpoint device (e.g., a mobile app). These options can be less than ideal for several reasons.

First, the physical disarm option poses challenges when customers are away from their location. A common scenario involves a pet, family member, or maintenance worker accidentally triggering a sensor after an initial alarm has been resolved. Although such instances can be resolved with agents at call centers, the system remains actively alarming, that is, the system continues to send alarm notifications to agents as well as sounding alarms at the premises, disturbing neighbors, persons passing by, and pets present in the home. The challenge here is that disarming systems has been traditionally left to customers, not agents. But when a person is away from their system and it is triggered, the situation results in continued alarm sounding at the premises and repeated alarm notifications to customers that fail to provide any further benefit to the customer. Without a remote disarm capability, these secondary triggers can generate additional alarm events, compounding the false alarm problem and potentially resulting in unnecessary emergency dispatches.

Second, the mobile app disarming option offers no help to those customers who either do not use smartphones, have not installed the necessary app, or are in situations where app access is impractical (e.g., when a customer attempts to operate their smartphone in a location/geographic region with poor data connectivity, dead battery, unfamiliarity with the interface, etc.). This can create a gap in accessibility during time-critical moments.

Third, monitoring centers typically have no mechanism to hand off disarm capability to verified customers after confirming a false alarm, other than simply communicating a recommendation (e.g., by telephone) to a customer to consider disarming their system in a particular circumstance. That is, even after a monitoring specialist has spoken with the customer and confirmed there is no emergency, the customer will still generally need to physically return to the premises or navigate the mobile app to prevent additional triggered sensors from generating new alarm events.

As summarized above, at least some examples disclosed herein are directed to systems and processes that allow end users of a system to remotely control (e.g., by sending a command to disarm a security system) the system via a Short Message Service (SMS) mechanism, such as by typing and sending a particular text message (e.g., "Disarm Now") in response to a system-generated prompt informing the user of a time-limited opportunity to disarm the system via a text message. SMS is a text messaging service component of most telephone, Internet and mobile device systems. It uses standardized communication protocols that let mobile phones exchange short text messages, typically transmitted over control channels (as opposed to data channels) of cellular networks.

Although many of the examples described herein relate to the ability to disarm a security system via SMS messaging, it should be appreciated that the disclosed system and/or techniques may additionally or alternatively be used to remotely control other types of systems or devices, such as by remotely controlling a thermostat, a light fixture, a water sensor, a garage door opener, an door lock (e.g., for a front door of a home), etc. As one illustrative example, a system may generate and send an SMS message to an individual prompting the individual to send a responsive SMS message including a particular phrase (e.g., "Respond with 'Open garage now' to open the garage door at 123 Main Street") and the system may automatically instruct the individual's garage door to open upon receipt of the correct phrase in a responsive SMS message (e.g., "Open garage now").

Some of the example systems and methods disclosed herein provide a secure, time-bounded mechanism that allows customers to execute a privileged system command (e.g., a disarm command) through a relatively open channel (SMS) while maintaining proper authorization, preventing replay attacks, and ensuring the action is contextually appropriate e.g., the system is actually armed and the request follows a legitimate alarm event). Additionally, some of the disclosed systems and methods are configured to deal with race conditions where multiple contacts might attempt to disarm simultaneously, or where the system state changes between the prompt being sent and the customer responding.

In some implementations, one or more components of a system may provide a time-bounded, context-aware remote control (e.g., security system disarm, thermostat adjustment, door unlocking, etc.) capability that activates automatically after resolution of a notification or an alarm (e.g., a burglary alarm), or after a change in the state of a system (e.g., when a security system transitions from a disarmed state to an armed state, or vice versa), etc. By leveraging an SMS communication channel and integrating with backend system control infrastructure, at least some embodiments of the present disclosure can enable customers to execute commands using simple text responses without requiring app installation, internet connectivity, or physical presence at the location monitored by a security system.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the advantages described will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1A shows components of an example system 100 configured to enable an end user (e.g., a person operating a customer device 102) to remotely control a system (e.g., disarm a security system) via an SMS message. The customer device 102 may correspond, for example, to one of the customer devices 102A-N described below in connection with FIGS. 2-5, where a customer interface 232A of the device includes an SMS messaging application. The remaining components of the system 100 may be included, for example, within the data center environment 224 of the system 200 described below in connection with FIGS. 2-5.

As shown in FIG. 1A, in addition to the customer device 102, in some implementations, the system 100 may include an SMS service 104, an SMS gateway 106, a system state controller 108, and various data stores 110, 112, 114 for storing records that the system 100 may access and use to facilitate the remote control of another system (e.g., IoT system 200 or a security system), as described in detail below. As also shown, in some implementations, the SMS service 104 may include an action eligibility evaluation component 116, an SMS message generation component 118, an SMS response evaluation component 120, and a data store 122 for storing records relating to SMS messages sent to customers prompting them to control their systems by reply SMS messages, if desired. In some implementations, the various functional components of the system 100 shown in FIG. 1 may be implemented by software and/or firmware executing on one or more processors of one or more computing systems, such as an IoT controller or device 322 described below in connection with FIG. 3. In this regard, although certain elements in FIG. 1A (e.g., the action eligibility evaluation component 116, the SMS message generation component 118, and the SMS response evaluation component 120 of the SMS service) are illustrated separately, it should be appreciated that in at least some implementations those elements may correspond to different functionalities or processes that are executed/performed by the same processor or group of processors. A table 138 (shown in FIG. 1B) illustrates example records that may be stored by the data store 122.

The action eligibility evaluation component 116 (included in the SMS service 104 shown in FIG. 1A) may be responsible for identifying circumstances in which it is appropriate to enable a user to control the user's system 200 (e.g., for the location 202A shown in FIG. 2) via an SMS message. As indicated by an arrow 124 in FIG. 1A, in some implementations, the action eligibility evaluation component 116 may receive, e.g., from the data store 110, data indicative of the status of alarms for a location 202 for this purpose. As used herein, the term "alarm" refers to the real-world experience of a customer having their alarm system, installed at a monitored location, detect an issue (such as an intrusion, an environmental issue, a reported medical emergency, or a "panic" signal received when a customer actuates a panic button), annunciate the issue through the triggering of an alarm state for the alarm system (for example, by triggering one or more sirens), and report the alarm details to a monitoring platform for handling. An "alarm" may also include subsequent activities of the monitoring center, customer contacts, dispatchers, and emergency services personnel. In some implementations, the data received from the data store 110 (per the arrow 124) may indicate, for example, whether individual alarms are "active" (indicating that the alarm is still under review), "canceled" (indicating that the alarm has been canceled), or "dispatched" (indicating that emergency services have been dispatched for the alarm), as possible alarm statuses. In some implementations, the SMS service 104 may update the alarm status data based on other incident data that is received from the data store 110, such as agent event data indicating that a monitoring agent canceled an alarm or requested the dispatch of emergency services. In some implementations, the data store 110 may be maintained or updated by a service (e.g., an alarm history service) that is responsible for aggregating data concerning the status of various alarms processed by the system 200. In some implementations, for instance, the action eligibility evaluation component 116 may subscribe to and receive notifications about certain alarm status changes from such a service.

In some implementations, the action eligibility evaluation component 116 may determine to enable SMS-driven control of the system 200 for the location 202 in response to determining that the alarm status data it receives (e.g., per the arrow 124 or otherwise) indicates that an alarm (e.g., a burglary alarm) for the location has been canceled or otherwise resolved (e.g., by a customer or monitoring personnel determining to clear the alarm). In this regard, it should be appreciated that completion of an alarm (e.g., so that its status is changed to "canceled") is but one example of a circumstance in which it might make sense to enable SMS-driven system control and that such a capability may likewise be provided in other circumstances, such as the clearing of an alarm from an environmental sensor (e.g., a water sensor, a temperature sensor, or the like).

As indicated by an arrow 126 in FIG. 1A, in some implementations, the action eligibility evaluation component 116 may additionally or alternatively receive data (e.g. from the data store 114) indicative of the state of the system 200 for the user's location (e.g., the location 202A), and may use such data to determine (or help determine) that it would be appropriate to enable a customer to remotely control the system 200 (e.g., to disarm the customer's alarm system, to set a thermostat to Eco mode, to unlock a door, etc.) via an SMS message. For instance, it may be desirable to send an SMS message to the primary contacts of the system 200 prompting them to send a responsive SMS message to set their thermostat to a lower-temperature Eco mode upon determining that the security system 200 has transitioned from a disarmed mode to an armed mode, as such a system state change commonly occurs when a property is being vacated for an extended period of time.

As indicated by an arrow 128 in FIG. 1A, in some implementations, the content of the data store 114 may be maintained by the system state controller 108 (e.g., a computing system and/or application), which may be responsible for responding to requests to control (e.g., to arm or disarm) the systems 200 for respective properties, as well as for updating the content of the data store 114 in response to the state of the systems 200 changing (e.g., from "armed" to "disarmed," or vice versa). As explained below in connection with FIGS. 2-5, the system state controller 108 may ordinarily receive such control requests from the mobile app on a customer device 102, from a base station 214 (e.g., in response to a command being entered on a keypad 208, or from an application within the monitoring agency environment 220). As indicated by an arrow 130 in FIG. 1A, however, in accordance with some embodiments of the present disclosure, the system state controller 108 may advantageously also receive such requests from the SMS response evaluation component 120 in at least certain circumstances, as explained in more detail below.

As indicated by an arrow 132 in FIG. 1A, in some implementations, the action eligibility evaluation component 116 may additionally receive, e.g., from the data store 112, data concerning the customer(s) to whom the alarm status data (per the arrow 124) or system state data (per the arrow 126) relates. Such customer data may be used, for example, to determine the phone numbers of one or more primary contacts who might be permitted to control of the system 200 for the property 202 via SMS messaging, to determine whether one or more preference settings for the customer indicate that SMS-driven control of the system 200 is an enabled feature for the customer, etc.

As indicated by arrows 134 and 136 in FIG. 1A, upon the action eligibility evaluation component 116 determining that one or more primary contacts are to be provided with the ability to control (e.g., disarm) the system 200 for their property (e.g., the location 202A) via SMS messaging, the action eligibility evaluation component 116 may both (A) instruct the SMS message generation component 118 to generate an SMS message prompting the contact(s) to provide a particular response if they wish to control the system 200 in a particular way (e.g., disarm a security system, unlock a door, adjust a thermostat, etc.), and (B) create a "record" corresponding to the generated message within the data store 122. As shown in the table 138 (in FIG. 1B), in some implementations, such records may include a phone number 140 to which a "prompt" is being sent via an SMS message, the name 141 of the primary contact associated with the phone number 140, the address 142 of the location 202 serviced by the system 200, the type 143 of event (e.g., burglary alarm) that prompted the generation of SMS message including the prompt, and a time window indicator 144 defining a predetermined, finite time window during which the contact may control the system 200 for the property 202 via SMS message. In some implementations, the time window indicator 144 may be set to a predetermined time in the future (e.g., an expiration time), such as thirty minutes after the time at which a particular type of action (e.g., the canceling of alarm), or thirty minutes after the time at which the action opportunity record is created, or thirty minutes after the time at which a prompt is sent, etc. In other implementations, the time window indicator 144 may instead simply be a time at which a particular type of action (e.g., the canceling of an alarm) occurred, or a time at which a record is created, or a time at which a prompt is sent, etc., with another component of the system (e.g., the SMS response evaluation component 120) being responsible for determining whether a properly formatted SMS response message requesting control is received within a predetermined, finite window of time (e.g., within thirty minutes) following that time.

As indicated by arrows 148 and 150 in FIG. 1A, after the SMS message generation component 118 has generated a prompt to be sent via SMS message to a particular phone number, the SMS message generation component 118 may send the prompt to the SMS gateway 106 for transmission to the customer device 102 as an SMS message. In one example implementation, the transmitted SMS message may state, "Would you like to disarm the SimpliSafe system at [address]? Reply with 'Disarm now'". The "[address]" field in such message may be populated, for example, using the address 142 in the action opportunity record created for the phone number. In implementations in which other types of SMS-driven control functions are enabled, e.g., unlocking doors, adjusting thermostats, etc., the transmitted SMS message may instead include a prompt such as, "Would you like to unlock the front door at [address]? Reply with 'Unlock now'", or "Would you like to change the thermostat at [address] to Eco mode? Reply with 'Eco mode now'", etc.

In response to receiving such an SMS message, the user of the customer device 102 may type and send a responsive SMS message. As indicated by arrows 152 and 154 in FIG. 1A, the SMS gateway 106 may receive such a responsive SMS message and forward it to the SMS response evaluation component 120 for processing. Upon receipt of a responsive SMS message, the SMS response evaluation component 120 may perform a multi-stage validation to determine whether to instruct the system state controller 108 to control the system 200 (e.g., by disarming the system 200, unlocking a door, adjusting a thermostat, etc.) for the corresponding location 202 (per the arrow 130).

One possible stage of the validation process may include using the phone number from which the responsive message originated to retrieve (per an arrow 156 in FIG. 1A) any active records for that phone number (e.g., based on the phone number 140 in such records) from the data store 122. If no active records associated with the phone number are found, the SMS response evaluation component 120 may generate appropriate content for a reply. As indicated by an arrow 158, such content may be provided to the SMS message generation component 118 to enable the SMS message generation component 118 to generate a reply message for transmission to the customer device 102 (via the SMS gateway 106). In some implementations, in this circumstance, the SMS response evaluation component 120 may generate a message indicating simply that the system is unable to process the customer's request and suggesting that the customer use another medium, e.g., a key pad 208 or a mobile app to provide instructions to the system.

Another possible stage of the response validation process performed by the SMS response evaluation component 120 may include evaluating the content of the responsive message to determine an intent of the user and determining to attempt to control the system only if the SMS response evaluation component 120 unambiguously classifies the response as an intent to take an action in reference to the system (e.g., to disarm a security system, change operation of an IoT system or device, etc.). For example, in some implementations, the SMS response evaluation component 120 may determine to attempt to control the system only if it determines the responsive message contained a particular phrase, such as "Disarm now", "Unlock now", "Eco mode now", etc. In some such implementations, if the response does not include the particular phrase, the SMS response evaluation component 120 may generate appropriate content for a reply SMS message, such as a message stating, "Invalid response. Reply 'Disarm now' to disarm.", "Invalid response. Reply 'Unlock now' to unlock the door.", "Invalid response. Reply 'Eco mode now' to set the thermostat to Eco mode.", etc. In other implementations, a more sophisticated or complex intent classification technique, e.g., by employing a trained machine learning model to perform intent classification, may additionally or alternatively be employed.

Still another possible stage of the response validation process performed by the SMS response evaluation component 120 may include verifying that the response was received within the finite time window defined by the time window indicator 144 included an active record retrieved from the data store 122 for the phone number from which the SMS response originated. If the SMS response evaluation component 120 determines (e.g., using the time window indicator 144) that the response was received later than the specified time window (e.g., more than 30 minutes after the action opportunity prompt was sent), the SMS response evaluation component 120 may generate appropriate content for a reply SMS message, such as a message informing the user that the system can no longer be controlled via a text message.

And yet another possible stage of the response validation process performed by the SMS response evaluation component 120 may include confirming the user who sent the SMS response message is a primary contact for location 202. This may involve evaluating the content of the record the SMS response evaluation component 120 retrieved from the data store 122 and/or using the phone number to retrieve additional data from the data store 112 or elsewhere relating to the customer's account. If the user associated with the phone number is not a primary contact, the SMS response evaluation component 120 may generate appropriate content for a reply SMS message, such as a message informing the user that they are not authorized to control the system via text message.

In response to the SMS response evaluation component 120 determining that the SMS response message (per the arrow 154) satisfies the applicable stages of the response validation process (as outlined above or otherwise), as indicated by the arrow 130 in FIG. 1A, the SMS response evaluation component 120 may send a request to the system state controller 108 to control the system 200 for the location 202 in question.

Upon receiving a request to control the system 200, the system state controller 108 may attempt to process the request and, as indicated by an arrow 160 in FIG. 1A, by send a responsive message to the SMS response evaluation component 120 indicating the success or failure of the attempt, possibly indicating the reason for the failure in circumstances in which the system state controller 108 is unable to take the requested action with respect to the system 200.

Upon receiving the success/failure response from the system state controller 108 (per the arrow 160), the SMS response evaluation component 120 may generate (per the arrow 158) content for an SMS reply to be sent to one or more primary contacts for the system. In some implementations, in the case of successful action, the SMS response evaluation component 120 may instruct the SMS message generation component 118 to send one message (e.g., "System Disarmed", "Door unlocked", "Thermostat set to Eco mode", etc.) to the primary contact who requested the action, and to also send another message (e.g., "The system was disarmed by [name]", "The front door was unlocked by

[name]," "The thermostat was set to Eco mode by [name]", etc.) to other primary contacts for the account, with the "[name]" field being populated to reflect the name of the primary contact who requested the action. In some implementations, in the case of an unsuccessful action, the SMS response evaluation component 120 may instruct the SMS message generation component 118 to send or more appropriate messages to contacts for the account. For example, in a circumstance in which the response (per the arrow 160) indicates that the request could not be processed because the system is already in a particular state (e.g., armed), the SMS response evaluation component 120 may instruct the SMS message generation component 118 to send an SMS reply message to the primary contact who sent the request indicating that the system is already in the particular state (e.g., an SMS message stating, "System already disarmed"). In some implementations, when the response (per the arrow 160) indicates that the request could not be processed for some other reason, the SMS response evaluation component 120 may instead instruct the SMS message generation component 118 to send one SMS reply message (e.g., "We couldn't disarm the system. Please try disarming by app, Keypad, or Key Fob") to the primary contact who sent the request, and to also send another SMS reply message (e.g., "A primary contact attempted to disarm, but their request failed. Please try disarming by app, Keypad, or Key Fob") to other primary contacts for the account.

Example processes 600 and 700 that may be performed by the action eligibility evaluation component 116 and the SMS response evaluation component 120, respectively, are described below in connection with FIGS. 6 and 7, following a description of an example system in which such components may be included.

Figure 2:
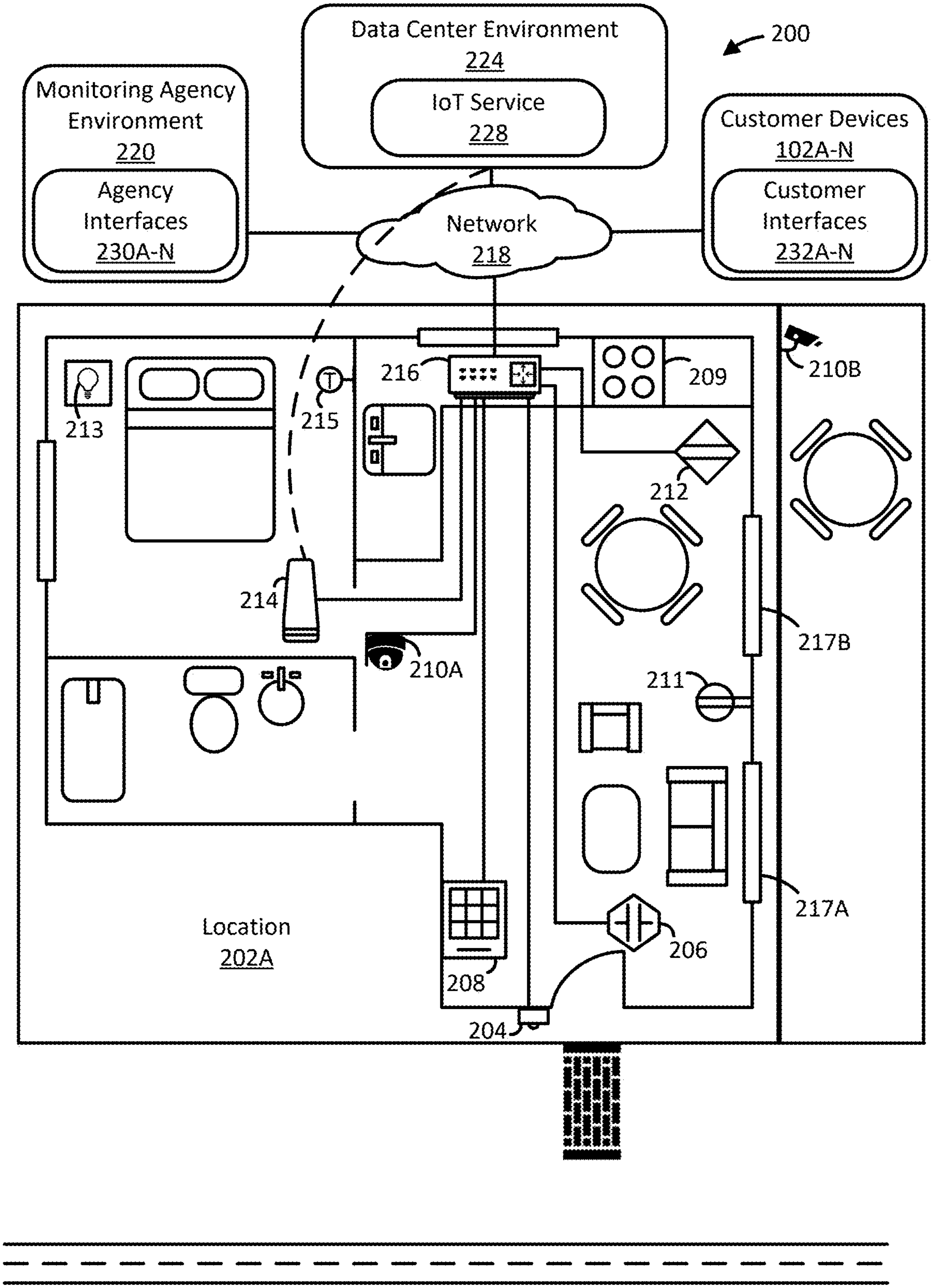
FIG. 2 is a schematic diagram of an internet of things (IoT) system, according to some examples described herein.

FIG. 2 is a schematic diagram of a system 200 (e.g., an IoT system) configured to implement various home automation processes via a plurality of IoT devices. For instance, the system 200 may be configured to monitor and control geographically disparate locations in accordance with some examples. As shown in FIG. 2, the system 200 may include computing and IoT devices installed at various locations (e.g., a location 202A subject to automation, a monitoring agency environment 220, a data center environment 224), one or more customer devices 102A-N, and a communication network 218. The network 218 may also include one or more computing devices. The devices 102A-N may be configured to host and execute one or more customer interface applications 232A-N. The environment 220 may be configured to host and execute one or more agency interface applications 230A-N. The environment 224 may be configured to host and execute an IoT service 228.

More specifically, as shown in FIG. 2, the location 202A may include a router 216 and sundry IoT devices. Examples of these devices include a computerized doorbell 204, an indoor camera 210A, an outdoor camera 210B, a contact sensor assembly 206, a keypad 208, a computerized oven 209, a computerized power outlet 211, a motion sensor assembly 212, computerized lighting 213, an IoT controller 214, and a computerized thermostat 215. As illustrated in FIG. 2, the device 204 may have a field of view (FOV) that originates proximal to a front door of the location 202A and can acquire images of a walkway, highway, and a space between the location 202A and the highway. The camera 210A may have an FOV that originates proximal to a bathroom of the location 202A and can acquire images of a living room and dining area of the location 202A. The camera 210A may further acquire images of an outdoor patio through windows 217A and 217B on the right side of the location 202A. The camera 210B may also acquire images of the outdoor patio. The assembly 206 may be configured to detect (e.g., via a magnetic sensor) whether the front door of the location 202A is open or closed and to communicate sensor data indicating the same to the controller 214. Similarly, the assembly 212 may be configured to detect (e.g., via an audio sensor) whether motion is present within a space proximal to the assembly 212 and to communicate sensor data indicating the same to the controller 214. It should be noted that the specific sensing modalities described above are not limiting to the present disclosure. For instance, as one of many potential examples, the assembly 212 may base its operation on acquisition of changes in ambient temperature or light rather than changes in reflected sound waves. The thermostat 215 may include a temperature sensor that can measure ambient air temperatures proximal to the thermostat 215 and circuitry to control heating, ventilation, and air conditioning (HVAC) equipment in the location 202A. When the temperature sensor detects the ambient air temperature, the thermostat 215 may communicate the sensor data to the controller 214 or to one or more other devices (e.g., one of the devices 102A-N or a computing device hosting and executing one of the interfaces 230A-N). The devices 204, 206, 208, 209, 210A, 210B, 211, 212, 213, and 215 may be referred to herein collectively as IoT devices. Any one of IoT devices may be referred to herein individually as an IoT device.

In some examples, the router 216 may be a wired or wireless router that is configured to communicate with the IoT devices and the controller 214 via communications that comport with a communications standard or protocol. Examples of standards and protocols supported by the router 216 may include any of the various Institute of Electrical and Electronics Engineers (IEEE) 802.11 standards, Transmission Control Protocol/Internet Protocol (TCP/IP), User Datagram Protocol (UDP), Hypertext Transfer Protocol (HTTP), and Message Queueing Telemetry Transport (MQTT), among others. As illustrated in FIG. 2, the router 216 may also be configured to communicate with the network 218. It should be noted that the router 216 may implement a local area network (LAN) within and extending outside and proximate to the location 202A by way of example only. Other networking technology that involves other computing devices may also be suitable for use within the location 202A. For instance, in some examples, the controller 214 may receive and forward communication packets transmitted by the camera 210A via a personal area network (PAN) protocol, such as BLUETOOTH, ZIGBEE, Z-WAVE, or the like. It should also be noted that, in some examples, the router 216 may include, or otherwise incorporate functionality of, the controller 214.

Continuing with the example of FIG. 2, the network 218 may include one or more public and/or private networks that support, for example, internet protocol (IP). The network 218 may include, for example, one or more LANs, one or more PANs, and/or one or more wide area networks (WANs). The WANs may include wired or wireless networks that support various WAN standards, such as the Code Division Multiple Access (CDMA) radio standard, the Global System for Mobiles (GSM) radio standard, and the like. The network 218 may connect and enable data communication between the devices within the location 202A, the environment 220, the environment 224, and the devices 102A-N. In at least some examples, both the environment 220 and the environment 224 may include network equipment (e.g., a router, cellular modem, cellular radio, or the like) that is configured to communicate with the network 218 and computing devices collocated with or near the network equipment.

Continuing with the example of FIG. 2, the environment 224 may include physical space, communications, cooling, and power infrastructure to support networked operation of computing devices. For instance, this infrastructure may include rack space into which the computing devices are installed, uninterruptible power supplies, cooling plenum and equipment, and networking devices. The environment 224 may be dedicated to the system 200, may be a non-dedicated, commercially available cloud computing service (e.g., MICROSOFT AZURE, AMAZON WEB SERVICES, GOOGLE CLOUD, or the like), or may include a hybrid configuration made up of dedicated and non-dedicated resources. Regardless of its physical or logical configuration, as shown in FIG. 2, the environment 224 may be configured to host and execute the service 228.

Continuing with the example of FIG. 2, the environment 220 may include a plurality of computing devices (e.g., desktop computers) and network equipment connected to the computing devices and the network 218. As illustrated in FIG. 2, the environment 220 may be configured to host the interfaces 230A-N. The devices 102A-N may include personal computing devices (e.g., a desktop computer, laptop, tablet, smartphone, or the like) and network equipment. As illustrated in FIG. 2, the devices 102A-N may be configured to host and execute the interfaces 232A-N.

Figure 3:
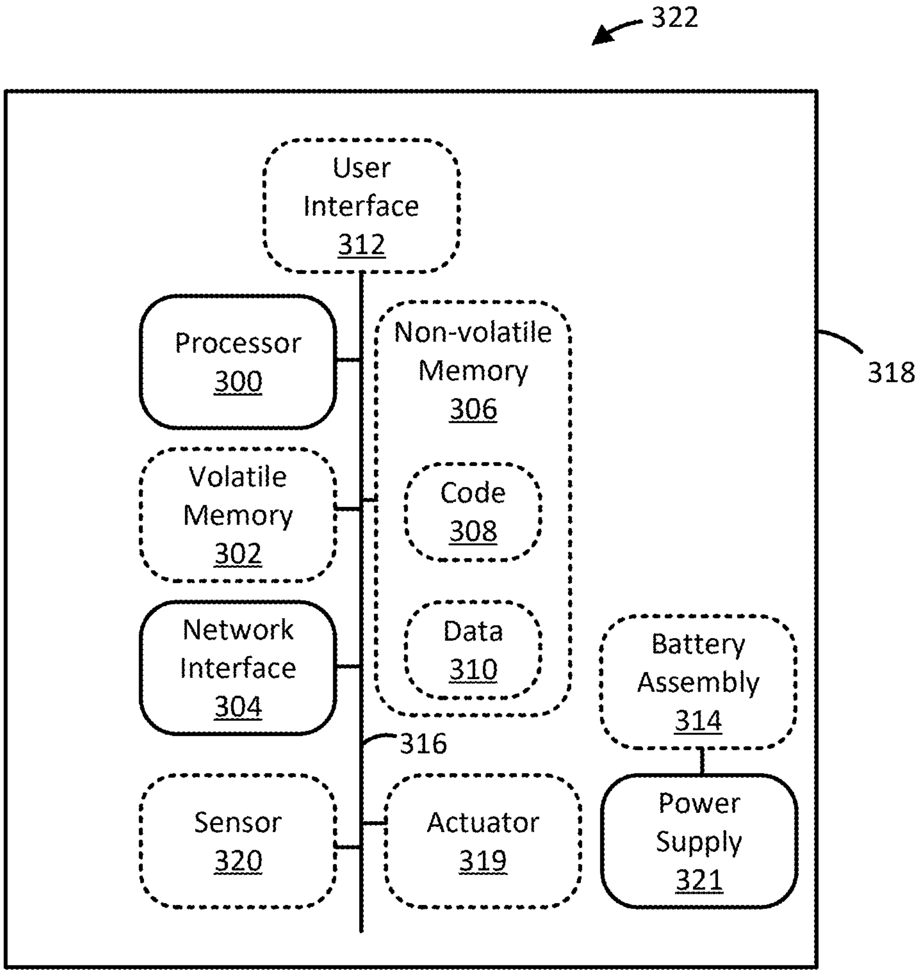
FIG. 3 is a schematic diagram of an IoT controller or device, according to some examples described herein.

Turning now to FIG. 3, which will be described with combined reference to FIG. 2, examples of the IoT controller 214 and the various IoT devices of FIG. 2 are schematically illustrated. As shown in FIG. 3, an IoT controller or device 322 may include a housing 318, at least one processor 300, a network interface 304, an interconnection mechanism 316, a power supply 321, and one or more of volatile memory 302, non-volatile memory 306, a user interface 312, a battery assembly 314, at least one sensor assembly 320, and at least one actuator 319. When present, the memory 306 may store executable code 308 and data 310. The processor 300, the memory 302, the memory 306, the code 308, the data 310, the interface 312, the assembly 314, the actuator 319, and the assembly 320 are illustrated in dashed lines to indicate optionality as any of these parts may be omitted or included in specific IoT devices or IoT controllers.

In some examples, the non-transitory memory 306 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 308 stored in the non-volatile memory may include an operating system (e.g., a version of Linux) and one or more applications or programs that are configured to execute under the operating system. Alternatively or additionally, the code 308 may include specialized firmware and embedded software that is executable without dependence upon a commercially available operating system. In some examples, the code 308 may specify a device control system (DCS) as described further below. Execution of the code by the processor 300 may result in manipulated data that may be stored in one or more data structures within the data 310. The data structures may have fields that are associated through colocation in the data structure. Such associations may likewise be established by allocating storage for the fields in locations within memory that convey an association between the fields. However, other mechanisms may be used to establish associations between information in fields of a data structure, including through the use of pointers, tags, or other mechanisms. It should be noted that, in some examples of the device 322, the operations executed by the processor 300 may be partially or fully hardcoded and/or implemented partially or entirely in hardware, rather than as a combination of hardware and the code 308.

Continuing with the example of FIG. 3, the memory 302 may include one or more static or dynamic random access memory (RAM) chips and/or cache memory (e.g., memory disposed on a silicon die of the processor 300). Memory 302 may offer a faster response time than a main memory, such as the memory 306.

Continuing with the example of FIG. 3, the processor 300 may include one or more processors that can execute one or more executable instructions, such as a computer program specified by the code 308, to control the operations of the device 322. Prior to execution of the code 308 the processor 300 may copy the code 308 from the memory 306 to the memory 302. As used herein, the term "processor" is used to describe circuitry that executes a function, an operation, or a sequence of operations. The function, operation, or sequence of operations may be hard coded into the circuitry and/or soft coded by way of instructions held in a memory device (e.g., the memory 302) and executed by the circuitry. In some examples, the processor 300 may be a digital processor, but the processor 300 may alternatively be analog, digital, or mixed. As such, the processor 300 may execute the function, operation, or sequence of operations using digital values and/or using analog signals. In some examples, the processor 300 may be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 300 that are multicore can provide functionality for parallel, simultaneous execution of instructions or for parallel, simultaneous execution of one instruction on more than one piece of data. In at least some examples, the processor 300 may be configured to implement a DCS configured to control operation of the respective device. In some examples, the DCS may include one or more programs (e.g., kernel or user mode programs) configured to execute with support of the operating system to control operation of the device. In other examples, a DCS may include special-purpose hardware configured to drive operation of the device.

Continuing with the example of FIG. 3, the processor 300 may control (e.g., through execution of a DCS) operation of the interface 304. For instance, in some examples, the interface 304 may include one or more physical interfaces (e.g., a radio (including an antenna), an ethernet port, a universal serial bus (USB) port, etc.) and a software stack including drivers and/or other code 308 that is configured to communicate with the one or more physical interfaces to support one or more of the communication standards described above with regard to the router 216 and the network 218. As such, the interface 304 may enable the device 322 to access and communicate with other devices (e.g., other IoT devices) via a computer network and/or a point-to-point connection. For instance, in some examples, the device 322 may communicate with the service 228, the interfaces 230A-N, and/or the interfaces 232A-N via the interface 304. The communications supported by the interface 304 may specify sensor data generated by the device 322 and/or commands to be executed by an IoT device, the interfaces 230A-N, and/or the interfaces 232A-N. In at least one example, the interface 304 may utilize sub-GHz wireless networking (e.g., IEEE 802.11) to transmit messages from the device 322 to other devices. Bands that the interface 304 may utilize for sub-GHz wireless networking include, for example, an 868 MHz band and/or a 915 MHz band. Use of sub-GHz wireless networking may improve operable communication distances and/or reduce power consumed to communicate. Other wired, wireless, and/or mesh network technology and topologies will be apparent with the benefit of this disclosure and are intended to fall within the scope of the examples disclosed herein.

Continuing with the example of FIG. 3, the processor 300 may control (e.g., through execution of a DCS) operation of the interface 312. For instance, in some examples, the interface 312 may include user input and/or output devices (e.g., a keyboard, a mouse, a touchscreen, a light emitting diode, a display, a speaker, a camera, an accelerometer, a biometric scanner, etc.) and a software stack including drivers and/or other code 308 that is configured to communicate with the user input and/or output devices. The interface 312 may enable the device 322 to interact with users to receive input and/or render output. This rendered output may include, for instance, visual, audible, or tactile output. For instance, in some examples, the interface 312 may render one or more graphical user interfaces (GUIs) including one or more controls configured to display output and/or receive input. The input may specify values to be stored in the data 310. The output may indicate values stored in the data 310. It should be noted that, in some examples, parts of the interface 312 may be accessible and/or visible as part of, or through, the housing 318.

Continuing with the example of FIG. 3, the processor 300 may control (e.g., through execution of a DCS) operation of the assembly 320. In certain examples, the assembly 320 may be configured to acquire signals (e.g., analog signals) and generate digital sensor data based on the acquired signals. The assembly 320 may include one or more sensors of various types and circuitry (e.g., an analog-to-digital converter) to digitize the signals. Types of sensors that may be housed within the assembly 320 include, for example, image sensors (e.g., a charge-coupled device or an active-pixel sensor), temperature or thermographic sensors (e.g., an active and/or passive infrared (PIR) sensor), magnetic sensors, microphones, or other types of sensors able to acquire signals indicative of environmental parameters. Regardless of the type of sensor or sensors housed, in some implementations, the assembly 320 may acquire sensor data from the housed sensor and stream the acquired sensor data to the processor 300 for subsequent storage and processing. This subsequent processing may include, for example, communication (e.g., via the interface 304) of the sensor data to other IoT devices; the controller 214; the interfaces 230A-N; the interfaces 232A-N; and/or the service 228. The sensor data may be processed by the controller 214 (or any device within the system 200) to detect occurrence of various events. These events may include, for example, priority events that require programmatic action beyond mere detection and recordation, such as an event that indicates a potential threat (and thus triggers an alarm) or events that occur proximal to the such an event. A priority event may have a certain type (e.g., break-in, fire, flood, device malfunction, etc.) or be an event of a certain type that satisfies additional criteria. For example, movement within a particular zone combined with a threat score that exceeds a threshold value may be a priority event, while movement within the particular zone combined with a threat score that does not exceed a threshold value may not be a priority event. Other examples of priority events will be apparent in view of this disclosure. Messages that specify priority events via inclusion of priority event data may be sent directly to the controller 214, another IoT device, and/or indirectly to any device within the system 200 (e.g., via the router 216).

Continuing with the example of FIG. 3, the actuator 319 may include control circuitry and one or more transducers or other components that can perform actions aside from data processing or storage. Some examples of the actuator 319 that may be included in particular IoT devices include motors, relays, solenoids, and linear actuators, to name a few. Via the actuator 319, the device 322 may effect changes to its environment and perform actions for which the device 322 is designed.

Continuing with the example of FIG. 3, the various features of the device 322 described above may communicate with one another via the mechanism 316. In some examples, the mechanism 316 may include a communications bus. In addition, in some examples, the supply 321 may be configured to supply operational power to the various features of the device 322 described above. In some implementations, the supply 321 may include power supply circuitry to receive, condition, and distribute line power to both operate the device 322 and recharge a rechargeable battery (e.g., one or more NiMH or lithium batteries) within the assembly 314, when present. The power supply circuitry may include, for example, a transformer and a rectifier, among other circuitry, to convert AC line power to DC device and recharging power.

One example of an IoT controller (e.g., the controller 214) illustrated by FIG. 3 is a base station. Such a base station may include the processor 300, the memory 302, the memory 306, the interface 304, the interface 312, the assembly 314, the supply 321, and the mechanism 316. In the base station, the memory 306 may store the code 308 and the data 310. In some examples illustrated by FIG. 3, the features of the base station enumerated above may be incorporated within, or be a part of, the housing 318.

In some examples, the base station may be configured to interoperate with the other IoT devices to provide local command and control and store-and-forward functionality. In some examples, to implement store-and-forward functionality, the base station, via execution of a DCS (e.g., specified in the code 308), may receive sensor data, packages the data for transport, and stores the packaged sensor data in local memory for subsequent communication. This communication of the packaged sensor data may include, for instance, transmission of the packaged sensor data as a payload of a message to the service 228 when a communication link to the service 228 via the network 218 is operational. In certain examples illustrated in FIG. 2, the interface 304 may include a cellular modem through which the processor 300 can establish a communication link (illustrated as a dashed arc) with service 228 via the network 218 if a connection to the service 228 is unavailable via the router 216. In some examples, packaging the sensor data may include filtering the sensor data and/or generating one or more summaries (maximum values, minimum values, average values, changes in values since the previous communication of the same, etc.) of multiple sensor readings. To implement local command and control functionality, the base station, via the DCS, may execute a variety of programmatic operations in response to various events. Examples of these events may include reception of commands from the keypad 208 or one or more of the interfaces 232A-N via one or more PAN links, reception of commands from one or more of the interfaces 230A-N or one or more of the interfaces 232A-N via the network 218, or detection of the occurrence of a scheduled event. The programmatic operations executed by the base station under control of the DCS may include setup, activation, or deactivation of one or more of the IoT devices; sounding of an alarm; and/or reporting an event to the service 228 to name a few operations. In some examples, the programmatic operations may further include generation and communication of messages that wake other IoT devices from sleep modes, messages that request streams of sensor data form the IoT devices, messages to trigger alarm responses in the other IoT devices, and/or other messages to initiate other operations. Further, in at least some examples, the programmatic operations may include communicating location data to the service 228. The location data may include data specifying sensor readings (sensor data), configuration data of any of the IoT devices, commands received from a user (e.g., via the keypad 208 or one of the interfaces 232A-N), and/or data derived from one or more of these data types (e.g., filtered sensor data, summarizations of sensor data, event data specifying an event detected at the location via the sensor data, etc.).

Additional customizations to the features illustrated in FIG. 3 may be present with certain examples of the base station. For instance, in some examples, the rechargeable battery within the assembly 314 of the base station may have a runtime capacity sufficient to operate the base station for twenty four hours or longer while the base station is disconnected from or otherwise not receiving line power. In certain examples, the interface 312 of the base station may include one or more light-emitting diodes (LEDs) and a 95 dB siren that the processor 300 can sound to indicate that a priority event has been detected. Additionally, in some examples, the base station may implement an MQTT broker configured to receive messages from the service 228 regarding one or more topics and to publish the messages to IoT devices subscribed to the topics.

Another example of an IoT device illustrated by FIG. 3 is a keypad (e.g., the keypad 208). Such a keypad may include the processor 300, the memory 302, the memory 306, the interface 304, the interface 312, the assembly 314, the supply 321, and the mechanism 316. In the keypad, the non-volatile memory 306 may store the code 308 and the data 310. In some examples illustrated by FIG. 3, the features of the keypad enumerated above may be incorporated within, or be a part of, the housing 318.

The keypad 208 may be configured to interact with (e.g., receive input from and/or render output to) a user and interoperate with the other IoT devices in response to interactions with the user. For instance, in some examples, the keypad 208 may be configured to receive input from a user that specifies one or more commands and to communicate the specified commands to one or more designated processes. These designated processes may include processes implemented by one or more of the IoT devices and/or one or more of the interfaces 230A-N, the interfaces 232A-N, or the service 228. The commands may include, for example, codes that authenticate the user as a resident of the location 202A and/or codes that request activation, deactivation, or configuration of one or more of the IoT devices. Alternatively or additionally, in some examples, the keypad 208 may include a user interface (e.g., a tactile interface, such as a set of physical buttons or a set of virtual buttons on a touchscreen) configured to interact with a user. Further still, in some examples, the keypad 208 may receive and respond to the communicated commands and render the responses via the user interface as visual or audio output.

In some examples, other devices like the keypad 208, which rely on user input to trigger an alarm condition, may be included within the system 200. Examples of such devices include dedicated key fobs and panic buttons. These dedicated security devices may provide a user with a simple, direct way to trigger an alarm condition, which can be particularly helpful in times of duress.

Another example of an IoT device illustrated by FIG. 3 is an IoT sensor (e.g., any of the devices 204, 210A, and 210B, the assembly 212, and the assembly 206). Other examples of IoT sensors include glass break sensors, carbon monoxide sensors, smoke detectors, water sensors, and temperature sensors to name a few. Such an IoT sensor may include the processor 300, the memory 302, the memory 306, the interface 304, the assembly 314, the supply 321, the mechanism 316, and the assembly 320. In the IoT sensor, the memory 306 may store the code 308 and the data 310. Some examples may include the interface 312 (e.g., the assembly 212 and the devices 204 and 210). Other examples may not include the interface 312 (e.g., the assembly 206). In some examples illustrated by FIG. 3, the features of the IoT sensor enumerated above may be incorporated within, or be a part of, the housing 318.

Additional customizations to the features illustrated in FIG. 3 may be present with certain examples of the IoT sensor. For instance, in some examples, a DCS executed via the processor 300 of the IoT sensor may control the interface 304 to stream (e.g., via UDP) sensor data acquired from the assembly 320 to the controller 214 or another device. Alternatively or additionally, in at least one example, the DCS executed via the processor 300 may control the IoT sensor to enter or exit a power conservation mode in response to reception of a sleep or wake signal from the controller 214 or another device.

In some examples in which the IoT sensor is an image capture device (e.g., any of the devices 204, 210A, and 210B), the assembly 320 may include an image sensor assembly and a light emitter and the interface 312 may include a speaker and/or a microphone. The image sensor assembly may include a lens and an image sensor configured to acquire light from an FOV and generate frames of image data based on the acquired light. The light emitter may include one or more light emitting diodes (LEDs), such as a red-green-blue emitting LED. Additionally or alternatively, the light emitter may also include an infrared emitting diode (e.g., to enable night vision) in some examples. The speaker may include a transducer configured to emit sound in the range of 60 dB to 80 dB or louder. Further, in some examples, the speaker may include a siren configured to emit sound in the range of 70 dB to 90 dB or louder. The microphone may include a micro electro-mechanical system (MEMS) microphone. The image capture device may be a battery-powered or line-powered outdoor IoT sensor configured to be installed and operated in an outdoor environment, such as outside a home, office, store, or other commercial or residential building, for example. Additionally or alternatively, the image capture device may be a battery-powered or line-powered indoor IoT sensor configured to be installed and operated in an indoor environment, such as within a home, office, store, or other commercial or residential building, for example.

Continuing with examples in which the IoT sensor is an image capture device, the processor 300 (e.g., through execution of a DCS) may control operation of the image sensor assembly, the light emitter, the speaker, and the microphone. For instance, in at least one example, when executing the code 308, the processor 300 may control the image sensor assembly to acquire sensor data, in the form of image data, to be streamed to one or more processes illustrated in FIG. 2 (e.g., the processes 230A-N, 228, or 232A-N) via the interface 304. Alternatively or additionally, in at least one example, through execution of the DCS, the processor 300 may control the light emitter to illuminate so that the image sensor assembly collects sufficient reflected light to compose the image data. Where the processor 300 has sufficient capacity and available power, the the processor 300 may process the image frames and transmit (e.g. via the interface 304) messages based on content depicted in the image frames. These messages may specify priority events and may be transmitted in place of, or in addition to, the image frames. Further, in some examples, through execution of the DCS, the processor 300 may control the speaker to emit sound. This sound may be locally generated (e.g., a sonic alarm via the siren) or streamed from one or more processes illustrated in FIG. 2 via the interface 304. Streamed sounds may include utterances from a user, for example. Further still, in some examples, through execution of the DCS, the processor 300 may control the microphone to acquire sensor data in the form of audio data for streaming to one or more processes illustrated in FIG. 2 via the interface 304.

Examples of IoT devices with actuators illustrated by FIG. 3 include the oven 209, the outlet 211, the light 213, and the thermostat 215. These devices may include the processor 300, the memory 302, the memory 306, the interface 304, the assembly 314, the supply 321, the mechanism 316, the assembly 320, and the actuator 319. In these devices, the memory 306 may store the code 308 and the data 310.

In various examples of these IoT devices, a DCS executed via the processor 300 may control the IoT device to measure, via the assembly 320, one or more environmental parameters; communicate, via the interface 304, the measured parameters to another device or process; and/or adjust, via the actuator 319, operation of the IoT device based thereon. Moreover, in some examples, the processor may receive, via the interface 304, commands to adjust operation of the IoT device and/or adjust, via the actuator 319, operation of the IoT device. As such, processes within the system 200 may control the oven 209 to adjust temperatures, turn on, or turn off, among other operations. Processes within the system 200 may control the outlet 211 to turn on or turn off, among other operations. Processes within the system 200 may control the light 213 to turn on, turn off, or dim, among other operations. Processes within the system 200 may control the thermostat 215 to turn on, turn off, or adjust a target temperature for an HVAC unit couple with the actuator 319, among other operations. Other types of IoT devices and operations associated therewith, will be apparent in view of this disclosure. For instance, in at least one example, the system 200 may include a computerized door lock with an actuator 319 that can lock or unlock a door.

Returning to examples illustrated by FIG. 2, individual interfaces 230A-N may be configured to control computing device interaction with monitoring personnel and to execute a variety of programmatic operations in response to the interactions. For instance, in some examples, an agency interface 230A may control its host device to provide information regarding priority events detected at monitored locations, such as the location 202A, to monitoring personnel. Such events may include, for example, movement or an priority event detected by one or more of the IoT devices. In some examples, the interface 230A may be configured to render GUIs including one or more image frames and/or other sensor data. Alternatively or additionally, in some examples, the interface 230A may control its host device to interact with a user to configure features of the system 200. Further example processes that the interfaces 230A-N may be configured to execute are described below with reference to FIG. 5. It should be noted that, in at least some examples, the interfaces 230A-N may be browser-based applications served to the environment 220 by webservers included within the environment 224. These webservers may be part of the service 228, in certain examples.

Continuing with the example of FIG. 2, individual interfaces 232A-N may be configured to control computing device interaction with a customer and to execute a variety of programmatic operations in response to the interactions. For instance, in some examples, the interface 232A may control its host device to provide information regarding priority events detected at monitored locations, such as the location 202A, to the customer. In some examples, the interface 232A may be configured to render GUIs including one or more image frames and/or other sensor data. Alternatively or additionally, in some examples, the interface 232A may be configured to process input received from the customer to activate or deactivate one or more of the IoT devices. Further still, in some examples, the interface 232A may configure features of the system 200 in response to input from a user. Further example processes that the interfaces 232A-N may be configured to execute are described below with reference to FIG. 5.

Figure 4:
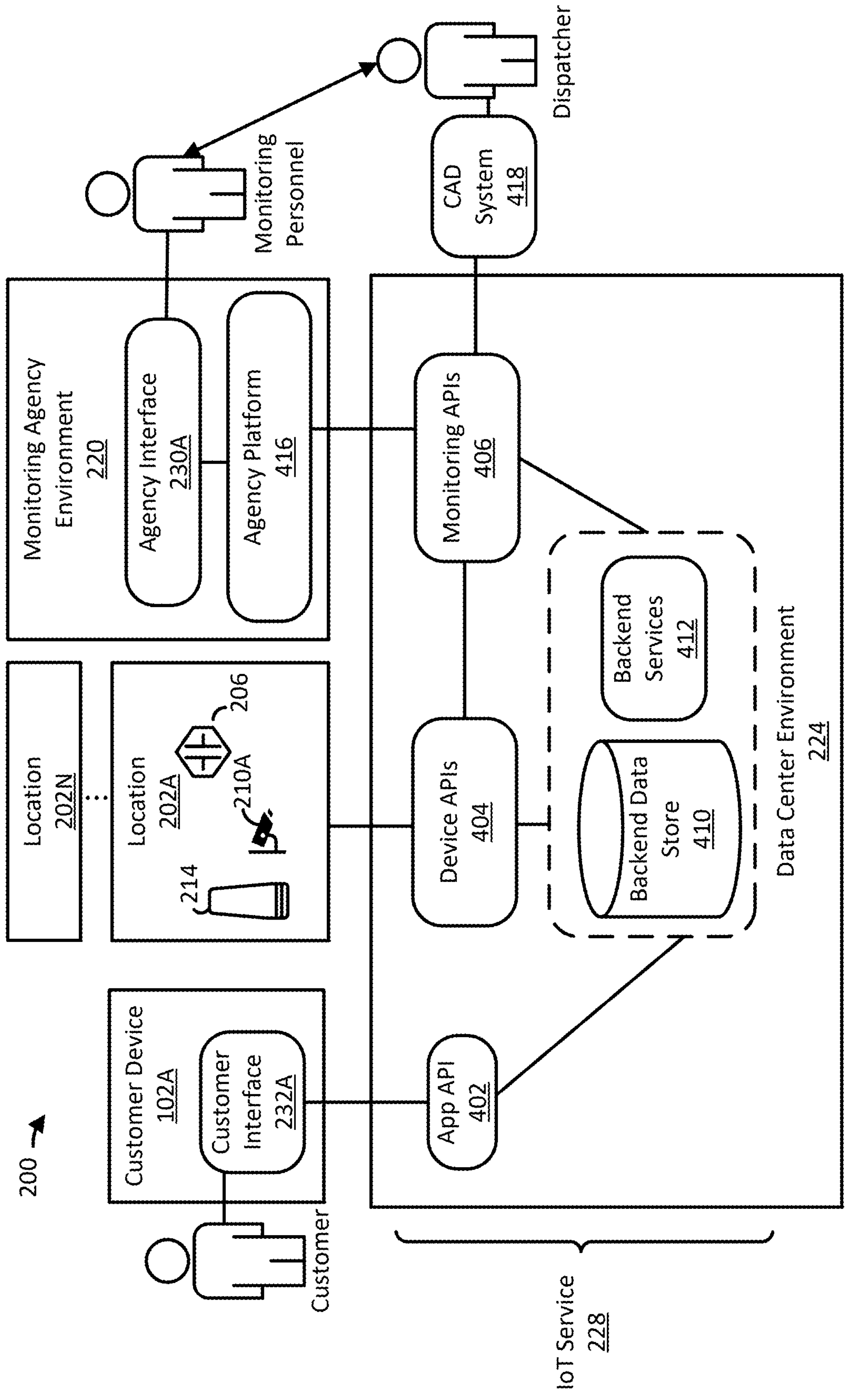
FIG. 4 is a schematic diagram of the IoT system of FIG. 2, illustrating additional detail, according to some examples described herein.

Turning now to FIG. 4, the system 200 of FIG. 2 is schematically illustrated with special emphasis on the service 228. As shown, the system 200 may include the environments 220 and 224, a customer device 102A of the devices 102A-N, and monitored locations 202A-N of FIG. 2. The system 200 may interoperate with a computer-aided dispatch (CAD) system 418, in some examples. As shown in FIG. 4, the environment 224 may host and execute the service 228. The service 228 may be configured to control overall logical setup and operation of the system 200. As such, the service 228 may interoperate with the interfaces 230A-N, the interfaces 232A-N, the controller 214, and/or any of the IoT devices of FIG. 2. In some examples, the service 228 may be configured to monitor data from a variety of sources for priority events (e.g., a break-in event) and, when a priority event is detected, notify one or more of the interfaces 230A-N and/or the interfaces 232A-N of the priority event. Some examples of processes that the service 228 may be configured to execute are described below with reference to FIG. 5.

As illustrated by FIG. 4, the service 228 may be configured to securely, reliably, and efficiently exchange messages between processes implemented by the IoT devices and processes implemented by other devices in the system 200. For instance, in some examples, the service 228 may implement and expose one or more application programming interfaces (APIs) that are configured to receive, process, and respond to calls from processes implemented by IoT devices, IoT controllers, and other devices within the system 200. In examples illustrated by FIG. 4, these APIs may include an app API 402, one or more device APIs 404, and one or more monitoring APIs 406. The APIs may be implemented using a variety of architectural styles and/or interoperability standards. For instance, in one example, the API may be a web services interface implemented using a representational state transfer (REST) architectural style. In this example, API calls may be encoded in HTTP along with JavaScript Object Notation (JSON) and/or extensible markup language (XML). These API calls may be addressed to one or more uniform resource locators (URLs) that are API endpoints monitored by the service 228. In some examples, portions of the HTTP communications may be encrypted to increase security. Alternatively or additionally, in some examples, the API may be implemented as an MQTT broker that receives messages and transmits responsive messages to MQTT clients hosted by IoT controllers (e.g., the controller 214 of FIG. 2) and/or the IoT devices. Alternatively or additionally, in some examples, the API may be implemented using simple file transfer protocol commands. Thus, the service 228 is not limited to a particular protocol or architectural style. It should be noted that, in at least some examples, the service 228 may transmit one or more API calls to IoT devices to request data from, or an interactive communication session with, the IoT devices.

Continuing with examples illustrated by FIG. 4, the service 228 may include backend services 412 and a backend data store 410. The services 412 may include a variety of processes that operate on data stored within the data store 410 and data inbound from, or outbound to, the APIs 402, 404, and 406. The APIs 402, 404, and 406 and the services 412 may interoperate via one or more messages (e.g., inter-process communications generated by API calls and responses; data packaged within, or extracted from, the API calls and responses; or the like). These messages and data may be stored in queues or other data structures within the data store 410 to manage flow of messages and data processed by the service 228. Particular examples of processes executed by the services 412 and the APIs 402, 404, and 406 are described further below. The data manipulated by these processes may include, for example, location data as described above with reference to FIG. 2, data generated by a customer interface 232A of the interface 232A-N of FIG. 2, and data generated by an agency interface 230A of the interfaces 230A-N of FIG. 2.

According to certain examples illustrated by FIG. 4, the data store 410 may include a variety of data structures configured to house various types of data. For instance in some examples, the data store 410 may include a relational database with tables configured to store structured data according to a highly normalized schema. Additionally or alternatively, the data store 410 may include a no-SQL database configured to store unstructured data. Moreover, the data store 410 may include one or more queues and surrounding services that support enqueuing and dequeuing of member data structures that house events (e.g., priority events) or other transactional data. The databases may be implemented using, for example, Oracle Database 23*ai*, commercially available from Oracle Inc.; SQL Server 2025 available from Microsoft; or MongoDB available from MongoDB, Inc., among others. The queues may be implemented using any of a variety of queuing technologies, such as KAFKA, IBM MQ, and AMAZON MQ to name a few. In some examples, the queues may include a first queue for event data inbound from the APIs 404, a second queue for event data inbound from the APIs 406, and a third queue for event data inbound from the API 402. It should be noted that data stored within any of the data stores disclosed herein may be stored by value or by reference (e.g., via a pointer, address, or other identifier of the data or the data's location).

In at least some examples, data structures within the data store 410 may be configured to link or otherwise associate data elements by collocating the elements within common records. For instance, in one example, an identifier of a user (e.g., a user account identifier) may be stored with location data in a single record to link or otherwise associate the user account with the location data. Other data elements (e.g., user account identifiers, device identifiers, location identifiers, environment identifiers, process identifiers, sensor reading identifiers, etc.) may be linked or associated using this approach. Examples of user accounts that may be identified via the user account identifiers include customer accounts, monitoring professional accounts, system administrator accounts, and third-party party dispatcher accounts, to name a few. Examples of devices that may be identified via device identifiers include the devices 102A-N, IoT devices, computing devices in the environment 224, and computing devices in the environment 220 of FIG. 2, to name a few. Examples of processes that may be identified via process identifiers include the interfaces 230A-N, the service 228, and the interfaces 232A-N of FIG. 2; the platform 416, the APIs 402, 404, and 406; the system 418, and individual services within the services 412 of FIG. 4; and DCSs among others.

Continuing with examples illustrated by FIG. 4, the services 412 may include a variety of services such as an image processing service, an event listening service, an event history service, and an identity provider. In some examples, the identity provider may be configured to receive authentication requests that include security credentials from a requesting process. Examples of these requesting processes include DCSs, the interface 232A, the interface 230A of FIG. 2, and the system 418 of FIG. 4, among other processes. When the identity provider can authenticate the security credentials in a request (e.g., via a validation function, cross-reference look-up, or some other authentication process), the identity provider may communicate a security token in response to the request. The requesting process may receive, store, and include the security token in subsequent messages to other processes, so that the other processes can authenticate the requesting process and securely handle (e.g., unpack/parse) the messages to extract data stored therein. In some examples, the image processing service may be configured to process sensor data (e.g., images and/or sequences of images) to identify movement, human faces, and other features within the sensor data. In certain examples, the event listening service may be configured to scan location data for event data and, where event data is identified, execute one or more event handlers to process the event data. In some examples, the event handlers may include an event reporter that is configured to identify priority events and to communicate messages specifying the priority events to one or more recipient processes (e.g., the interface 232A of FIG. 2, the interface 230A of FIG. 2, the event history service, etc.). In some examples, the event listening service may interoperate with the image processing service to identify events from sensor data. In some examples, the event history service may be configured to retrieve event data from the data store 410, organize the event data into lists, and publish the organized lists to the API 402 or the API 406 for delivery to the interface 232A or the interface 230A. These lists may be organized around specific types of events (e.g., priority events, sequences of priority events, dispositions of priority events, etc.). The sequences of priority events may include, for example, events generated during handling of an event via the interface 232A or the interface 230A. In one particular example, a list of events generated by the event history service may include a break-in event, events generated by the interface 230A while monitoring personnel handle the event, and an event generated by disposition of the break-in event via the interface 232A. Other services that may be included within the services 412 will be apparent in view of this disclosure.

Continuing with examples illustrated by FIG. 4, the location 202A may include the controller 214, the camera 210A, and the assembly 206 of FIG. 2. These devices may be configured to detect events (e.g., priority events) that occur at the location 202A and communicate messages regarding the events and other information (e.g., location data) to the service 228 via the APIs 404. This other information may include, for example, audio-visual sensor data acquired by the camera 210A and arm/disarm events processed by the IoT devices. As will be apparent in view of this disclosure, the devices 214, 210A, and 206 are illustrated by way of example only, and the location 202A may omit any of these devices or include other devices.

As shown in FIG. 4, the interface 232A may comprise an application ("app") that is hosted and executed by the device 102A. In some examples, the interface 232A may be configured to interact with a customer to both receive input and render output regarding aspects of the system 200 accessible to the customer. For instance, in certain examples, the interface 232A may be configured to control its host to render a GUI with controls configured to interact with the user. These controls may, for example, display indications of actions taken by the various actors involved in handling an event (e.g., a priority event) generated by one or more devices at the location 202A.

As illustrated in FIG. 4, the environment 220 may include one or more computing devices that host and execute the interface 230A and an agency platform 416. In some examples, the interface 230A may comprise a browser-based application served by the platform 416 and executed by computing devices within the environment 220 via browsers accessible by monitoring personnel. Alternatively or additionally, in certain examples, the platform 416 may operate as a service to a specialized, native version of the interface 230A executing on the computing device accessible by monitoring personnel. For example, in some implementations, the interface 230A may comprise a combination of an application provided by the monitoring agency provider that interacts with the platform 416, and a browser-based extension for video verification that interacts with the environment 224 via the APIs 406. The interface 230A may be configured to interact with monitoring personnel to both receive input and render output regarding events, including alarms and other priority events, triggered at monitored locations, such as the location 202A. For instance, in some examples, the interface 230A may be configured to notify monitoring personnel of the occurrence of events at monitored locations, render audio-visual data and other sensor data collected by IoT devices at the monitored locations and stored in the data store 410, and establish connections (e.g., real-time connections) with IoT devices and/or IoT controllers. Further, in some examples, the interface 230A may include controls configured to receive input specifying actions taken by the monitoring personnel to address events, such as interacting with actors including customers, customer contacts, dispatchers, and/or first responders called upon to investigate the events. These actions may include, for example, taking or making calls from or to customers regarding an event (e.g., a priority event, such as an alarm); verifying the authenticity of an event; making contact with individuals at a location reporting an event; calling an appropriate Public Safety Answering Point (PSAP) to request dispatch of emergency responders, such as police, fire, or emergency medical services; updating status information regarding such dispatches; updating status information for events; and canceling alarms and/or dispatched responders, to name a few actions. Some or all of these and other actions may be handled by the platform 416, which may then translate them into events that are communicated to the service 228 via the APIs 406.

Continuing with examples illustrated by FIG. 4, the platform 416 may be configured to interoperate with a plurality of agency interfaces (e.g., the interfaces 230A-N of FIG. 2). In these examples, the platform 416 may exchange messages with the interface 230A to drive workflows conducted by monitoring personnel (e.g., reviewing events occurring at monitored locations, contacting monitoring agency customers, contacting dispatchers, following up on events, canceling false alarms, closing out fully addressed events, etc.). In some examples, the platform 416 may include a queue that stores data representative of events currently being handled by monitoring personnel. The platform 416 may be configured to receive event data from the environment 224 (e.g., from the data store 410 via the APIs 406) and to store the event data in the queue. In these examples, the queue may identify individual events and may prioritize the events for urgency in handling, relative to one another.

Continuing with examples illustrated by FIG. 4, the platform 416 may be further configured to receive one or more messages from the interface 230A specifying handling operations originated by a monitoring professional. These handling operations may include, for example, selection (via interaction between the monitoring professional and the interface 230A) of the event data for handling by the monitoring professional, designation that event handling is in process, and/or designation of a resolution of the event. In response to reception of a handling operation selecting the event data for handling, the platform 416 may link (e.g., record an association between) the selected event data and the interface 230A utilized by the monitoring professional. The agency platform 416 may be further configured to notify the interface 230A associated with the monitoring professional of subsequently enqueued event data regarding the event until event disposition.

As shown in FIG. 4, the platform 416 may be further configured to interoperate with the monitoring APIs 406. For instance, in some examples, the platform 416 may be configured to exchange messages with the monitoring APIs 406 that generate events (e.g., priority events). These events may result, for example, from actions taken by monitoring personnel as part of the workflows performed. The events may include, for instance, initiation or escalation of an alarm initiated by monitoring personnel or an IoT device. The messages exchanged between the platform 416 and the APIs 406 may further specify updates to event data resulting from handling operations. In some examples, the API 406 may be configured to store update messages regarding the events in the queue described above for subsequent processing by one or more of the services 412 (e.g., the event history service).

It should be noted that the platform 416 may be implemented within the environment 220 (as illustrated in FIG. 4), implemented within the environment 224 along with the remainder of the service 228, or independently hosted.

In some examples, the APIs 402, 404, and 406 may be configured to implement and expose APIs to interoperate respectively with the interface 232A; the devices 214, 210A, and 206; the platform 416; and the system 418. In at least some examples, the APIs 402, 404, and 406 may be respectively configured to establish, and exchange messages via, connections (e.g., WebSocket or Socketlink connections) with the interface 232A; the DCSs of the devices 214, 210A, and 206; the platform 416, and the system 418. The APIs 402, 404, and 406 may be further configured to store the messages and/or data extracted therefrom in the data store 410 for subsequent processing. Such storage may include storing multiple copies of the messages or the extracted data in any of the various data structures described above. For instance, with regard to the APIs 404, the messages may include data specifying events (e.g. event data), as described herein, and the APIs 404 may be configured to extract the event data and store the extracted data within a queue allocated in the data store 410.

Continuing with the example of FIG. 4 with regard to the API 402, received messages may include data (e.g., location data) specifying events, as described herein, as well as commands regarding events (e.g., requests to cancel an alarm or send help to a location). These commands and events may be generated by the interface 232A, and the API 402 may store the generated commands and events in the data store 410 for subsequent processing. In certain examples, the API 402 may be further configured to receive event data updated by one or more of the services 412 (e.g., the event history service) and supply the updated event data to the interface 232A for rendering or other processing.

Continuing with the example of FIG. 4 with regard to the APIs 406 received messages may include data specifying events (e.g., event data). In some examples, the APIs 406 may be further configured to interoperate with the data store 410 to manipulate event data stored therein. This manipulation may include updating the event data based on actions taken by monitoring personnel, as reported via the interface 230A and the platform 416. In some examples, the APIs 406 may support the Automated Secure Alarm Protocol and may be configured to communicate messages specifying events with the system 418 operated by dispatchers at PSAPs and to add to or modify the events stored in the data store 410 based on the messages from the system 418. One example of a commercially available CAD system that may be used to implement the system 418 is the PREMIERONE dispatch software commercially available from Motorola Solutions, Inc., of Chicago, Illinois, US.

It should be noted that examples illustrated by FIG. 4 are not limited to single environments 220 and 224 or a single system 418. Other variations will be apparent in view of this disclosure.

Figure 5:
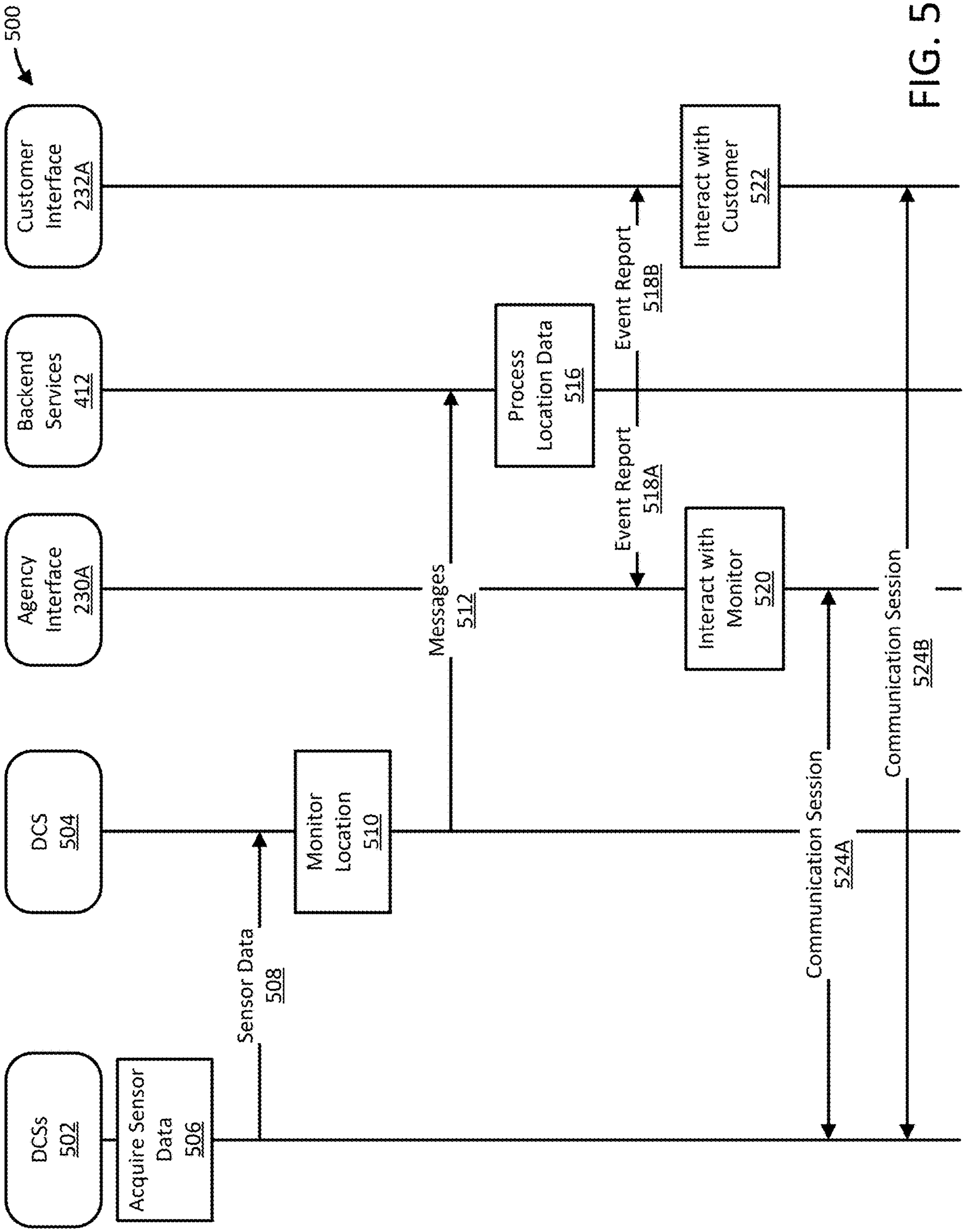
FIG. 5 is a sequence diagram of a monitoring process, according to some examples described herein.

Turning now to FIG. 5, a monitoring process 500 is illustrated as a sequence diagram. The process 500 may be executed, in some examples, by an IoT system (e.g., the system 200 of FIG. 2). More specifically, in some examples, at least a portion of the process 500 may be executed by one or more IoT devices under control of one or more DCSs 502 (e.g., the code 208 of FIG. 2) implemented by one or more processors (e.g., the processor 200 of FIG. 2). At least a portion of the process 500 may be executed by a base station (e.g., the controller 214 of FIG. 2) under control of a DCS 504 implemented by at least one processor of the base station. At least a portion of the process 500 may be executed by one or more computing devices within a monitoring agency environment (e.g., the environment 220 of FIG. 2) under control of an agency interface (e.g., the interface 230A of FIG. 2). At least a portion of the process 500 may be executed by one or more computing devices within a data center environment (e.g., the environment 224 of FIG. 2) under control of backend services (e.g., the services 412 of FIG. 4). At least a portion of the process 500 may be executed by a customer device (e.g., the device 102A of FIG. 2) under control of a customer interface (e.g., the interface 232A of FIG. 2).

As shown in FIG. 5, the process 500 may start with the DCSs 502 of one or more IoT devices acquiring 506 sensor data descriptive of a location (e.g., the location 202A of FIG. 2). The sensor data acquired may be any of a variety of types, as discussed above with reference to FIGS. 2-4. In some examples, the DCSs 502 may acquire sensor data continuously. In some examples, the DCSs 502 may acquire sensor data in response to an event, such as expiration of a local timer (a push event) or receipt of an acquisition polling signal communicated by the DCS 504 (a poll event). In certain examples, at least one of the DCSs 502 may stream sensor data to the DCS 504 with minimal processing beyond acquisition and digitization. In these examples, the sensor data may constitute a sequence of vectors with individual vector members including a sensor reading and a timestamp. Alternatively or additionally, in some examples, at least one of the DCSs 502 may execute additional processing of sensor data, such as generation of one or more summaries of multiple sensor readings. Further still, in some examples, at least one of the DCSs 502 may execute sophisticated processing of sensor data. For instance, if an IoT sensor includes an image capture device, the IoT sensor may execute image processing routines such as edge detection, motion detection, facial recognition, threat assessment, and priority event generation.

Continuing with the process 500, the DCSs 502 may communicate the sensor data 508 to the DCS 504. As with sensor data acquisition, the DCSs 502 may communicate the sensor data 508 continuously or in response to an event, such as a push event or a poll event.

Continuing with the process 500, the DCS 504 may monitor 510 the location by processing the received sensor data 508. For instance, in some examples, the DCS 504 may execute one or more image processing routines. These image processing routines may include any of the image processing routines described above with reference to the operation 506. By distributing at least some of the image processing routines between the DCSs 502 and the DCS 504, some examples may decrease power consumed by battery-powered devices by off-loading processing to line-powered devices. Moreover, in some examples, the DCS 504 may execute an ensemble threat detection process that utilizes sensor data 508 from multiple, distinct IoT devices as input. For instance, in at least one example, the DCS 504 may attempt to corroborate an open state received from a contact sensor with motion and facial recognition processing of an image of a scene including a window to which the contact sensor is affixed. If two or more of the three processes indicate the presence of an intruder, the threat score may be increased and a priority event may be declared, locally recorded, and communicated. Other processing that the DCS 504 may execute includes outputting local alarms (e.g., in response to detection of particular events and/or satisfaction of other criteria) and detection of maintenance conditions for IoT devices, such as a need to change or recharge low batteries and/or replace or maintain the IoT devices. Any of the processes described above within the operation 510 may result in the creation of location data that specifies the results of the processes.

Continuing with the process 500, the DCS 504 may communicate the location data to the services 412 via one or more messages 512. As with sensor data 508 communication, the DCS 504 may communicate the location data continuously or in response to an event, such as a push event (originating with the DCS 504) or a poll event (originating with the services 412).

Continuing with the process 500, the services 412 may process 516 received location data. For instance, in some examples, the services 412 may execute one or more routines described above with reference to the operations 506 and/or 510. Additionally or alternatively, in some examples, the services 412 may calculate a threat score or further refine an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the services 412 may increase a threat score calculated by at least one of the DCSs 502 and/or the DCS 504. In some examples, the services 412 may determine, e.g., by applying a set of rules and criteria to the location data, whether the location data includes any priority events and, if so, may communicate an event report 518A and/or 518B to the interface 230A and/or the interface 232A. The reports 518A and/or 518B may have a priority score based on the same criteria used to determine whether the event reported therein is a priority event or may have a priority score based on a different set of criteria or rules.

Continuing with the process 500, the interface 230A may interact 520 with monitoring personnel through, for example, one or more GUIs. These GUIs may provide details and context regarding one or more priority events. In addition, the GUIs may enable a user to initiate a communication session 524A (e.g, via a WebRTC connection) between the device executing the interface 230A and one or more of the IoT devices executing the DCSs 502. Once a communication session is established, the GUI may request transmission of additional sensor data and/or request that the IoT devices render output via a user interface (e.g., a user interface 212 of FIG. 2) or take an action via an actuator (e.g., the actuator 219 of FIG. 2).

Continuing with the process 500, the interface 232A may interact 522 with at least one customer through, for example, one or more GUIs. These GUIs may implement and offer features similar to, or the same as, the GUIs described above within the operation 520. For instance, the GUIs may enable a user to initiate a communication session 524B between the device executing the interface 232A and one or more of the IoT devices executing the DCSs 502.

It should be noted that the processing of location data (e.g., sensor data), as described above with reference to the operations 506, 510, and 516, may be executed by processors disposed within various parts of the system 200. For instance, in some examples, the DCSs 502 may execute minimal processing of the data (e.g., acquisition and streaming only) and the remainder of the processing described above may be executed by the DCS 504 and/or the services 412. This approach may be helpful to prolong battery runtime of IoT devices. In other examples, the DCSs 502 may execute as much of the data processing as possible, leaving the DCS 504 and the services 412 to execute only processes that require data that spans IoT devices and/or locations. This approach may be helpful to increase scalability of the system 200 with regard to adding new locations or devices.

Figure 6:
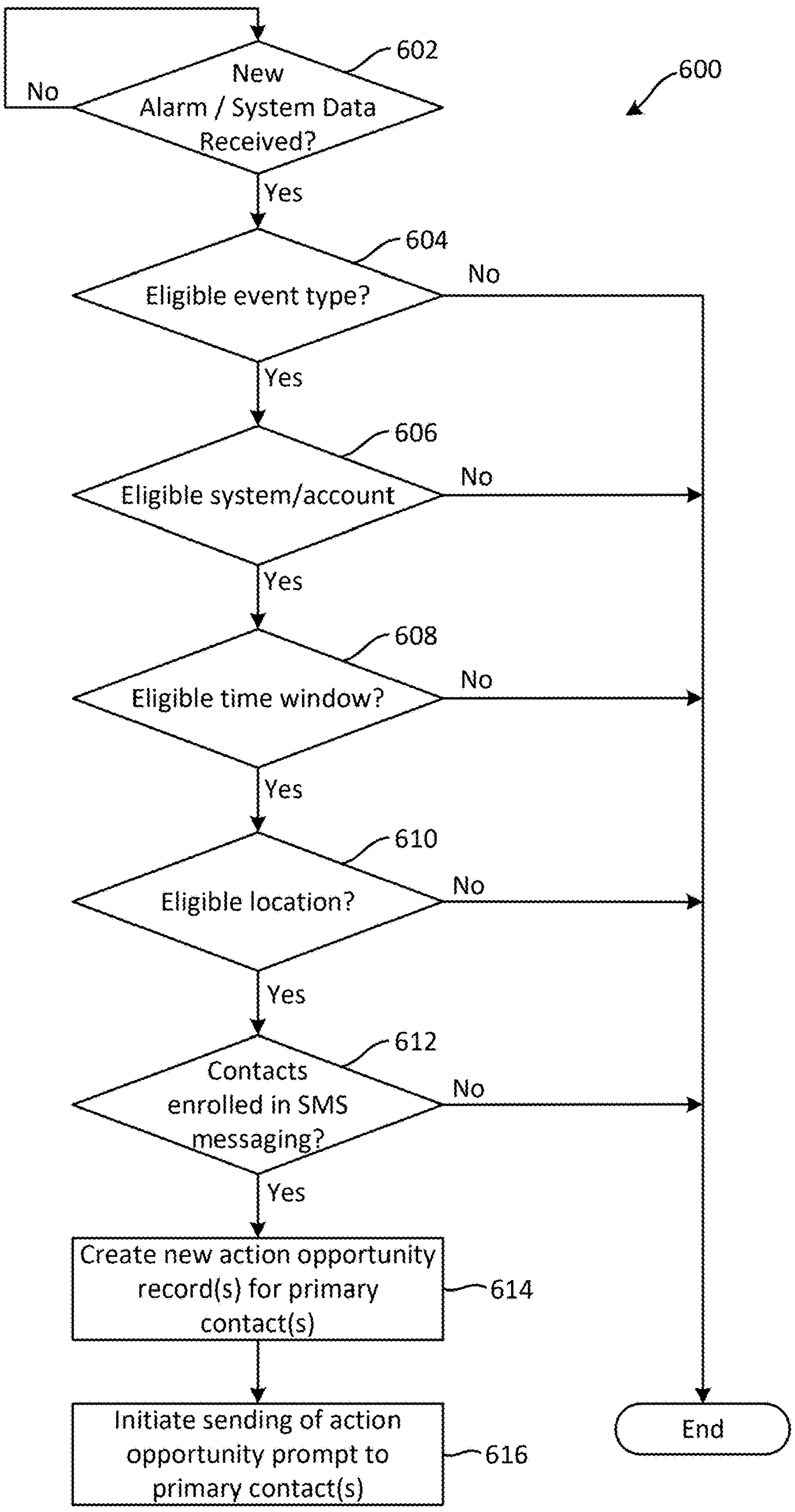
FIG. 6 is a flowchart showing an example process that may be performed by the SMS service shown in FIG. 1A, in accordance with some implementations of the present disclosure.

Turning next to FIG. 6, the example process 600, which may be performed by the action eligibility evaluation component 116 of the SMS service 104 shown in FIG. 1A, will now be described. As shown, the process 600 may begin when the action eligibility evaluation component 116 determines, per a decision 602, that new data has been received from one or more components of the system 100 (e.g., per the arrow 134 and/or the arrow 126 in FIG. 1A) that may indicate a circumstance in which primary contacts for a location 202 are to be given an opportunity to take an action (e.g., disarm a security system 200, unlock a door, adjust a thermostat, etc.) via text message. For instance, as noted above, in some implementations, the action eligibility evaluation component 116 may subscribe to receive notifications from an alarm history service concerning circumstances in which at least certain types of alarms (e.g., burglary alarms, temperature sensor alarms, water alarms, etc.) have been canceled or otherwise resolved. Additionally or alternatively, the action eligibility evaluation component 116 may subscribe to receive notifications about certain system state records, e.g., when security systems 200 transition from a disarmed state to an armed state or vice versa.

Upon receiving such data, the process 600 may proceed through a set of decisions 606, 606, 608, 610, 612 (either in series or in parallel, or partially in series and partially in parallel), during which the action eligibility evaluation component 116 may evaluate whether particular criteria for enabling controlling of the system via SMS messaging are satisfied. As illustrated, in some implementations, when the action eligibility evaluation component 116 determines that one or more of the indicated criteria are not satisfied, the process 600 may terminate. Otherwise, when the action eligibility evaluation component 116 determines that the applicable criteria are satisfied, the process may proceed to a step 614, at which the action eligibility evaluation component 116 may create a new record (e.g., an action opportunity record) in the data store 122 (as described above in connection with FIGS. 1A-B), and may also proceed to a step 616, at which the action eligibility evaluation component 116 may initiate the sending of action opportunity prompts to one or more primary contacts for the security system 200, such as by instructing the SMS message generation component 118 to generate a prompt (per the arrow 148), as described above in connection with FIG. 1A.

At the decision 604 of the process 600, the action eligibility evaluation component 116 may determine whether the received data relates to an event type (e.g., the canceling of a particular type of alarm, such as burglary alarm) that is eligible for enabling a user to control the system 200 via SMS message. In some implementations, for example, the data received from the data store 110 (e.g., from an alarm history service) may include indicators of the types of alarms that have been recently canceled or otherwise resolved. In such implementations, per the decision 604, the action eligibility evaluation component 116 may determine whether such indicators correspond to one or more specific alarm types (e.g., the cancelation of burglary alarms, alarms for certain types of environmental sensors, etc.) that are eligible for enabling a user to take an action (e.g., disarming a security system) via SMS messaging and may proceed to the steps 614 and 616 only if the alarm-related event in question is of an appropriate type. As another example, the data received from the data store 114 may indicate that a system-related event, e.g., the security system 200 transitioning to from a disarmed state to an armed state, or vice versa, has occurred. In such implementations, per the decision 604, the action eligibility evaluation component 116 may determine that type of event is eligible for enabling a user to take a particular action (e.g., setting a thermostat to Eco mode) via SMS messaging and may proceed to the steps 614 and 616 only if the system-related event in question is of an appropriate type.

At the decision 606 of the process 600, the action eligibility evaluation component 116 may determine, e.g., by evaluating data retrieved from the data store 112, whether the system/account to which the alarm relates is configured for SMS message processing and/or whether one or more preference settings for the system/account indicate that taking an action (e.g., disarming a security system) via SMS messaging is to be permitted and may proceed to the steps 614 and 616 only if the system/account is in a state in which enabling the taking such an action by SMS messaging is appropriate.

At the decision 608 of the process 600, the action eligibility evaluation component 116 may determine, e.g., by evaluating a time stamps included with records received from the data store 110 and/or the data store 114, whether the event in question (e.g., the cancelation of an alarm, the transition from a disarmed state to an armed state, etc.) occurred within a finite window of time in the past, e.g., within the past thirty minutes and may proceed to the steps 614 and 616 only if the event occurred within that time widow.

At the decision 610 of the process 600, the action eligibility evaluation component 116 may determine whether the event in question occurred with respect to a system (e.g., a security or IoT system) in which control via SMS messaging in to be permitted. In some implementations, for example, the data received from the data store 110 (e.g., from an alarm history service) may include indicators of the locations to which the alarms or notifications relate and the action eligibility evaluation component 116 may proceed to the steps 614 and 616 only if the indicated location meets one or more criteria (e.g., is within the United States).

At the decision 612 of the process 600, the action eligibility evaluation component 116 may determine whether one or more primary contacts for the system/account to which the eligible event relates has enrolled for SMS messaging with the system. In some implementations, the action eligibility evaluation component 116 may retrieve data, e.g., data indicating settings and/or preferences relating to SMS messaging for certain customers and/or accounts, from the data store 112 (per the arrow 132 in FIG. 1A) to make such a determination and may procced to the steps 616 and 618 only if one or more of the primary contacts has enrolled for SMS messaging.

Figure 7:
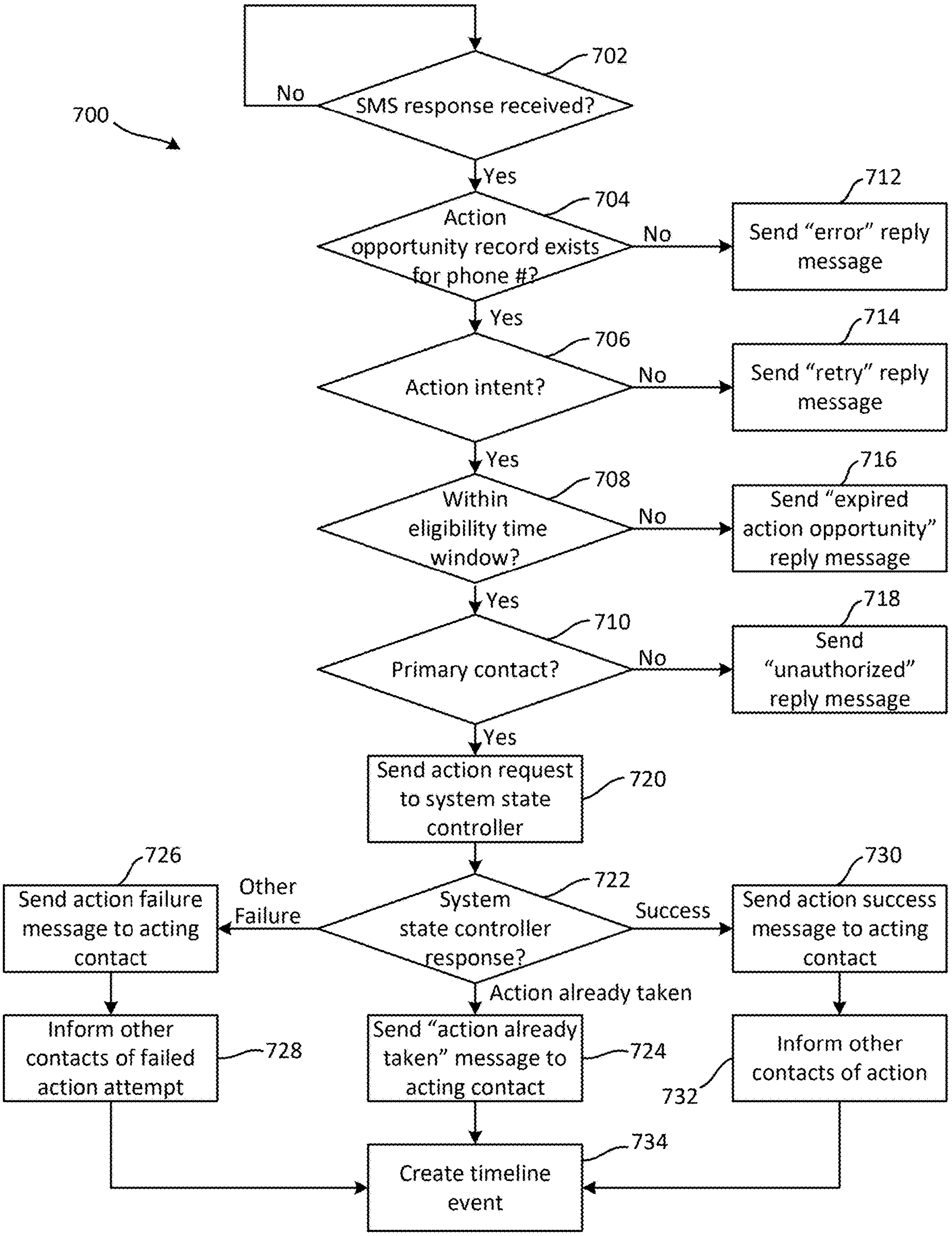
FIG. 7 is a flowchart showing an example process that may be performed by the SMS service shown in FIG. 1A, in accordance with some implementations of the present disclosure.

Turning next to FIG. 7, the example process 700, which may be performed by SMS response evaluation component 120 of the SMS service 104 shown in FIG. 1A, will now be described. As shown, the process 700 may begin when the SMS response evaluation component 120 determines, per a decision 702, that a SMS response message has been received (e.g., per the arrow 154 FIG. 1A) from the SMS gateway 106.

Upon receipt of an SMS response message from the SMS gateway 106, the SMS response evaluation component 120 may perform a multi-stage validation of the SMS response, per the decisions 704, 706, 708, and 710, to determine whether various criteria for controlling the system 200 (e.g., disarming a security system, unlocking a door, adjusting a thermostat, etc.) via SMS messaging are satisfied. Examples of possible validation stages that may be employed for this purpose are also described above in connection with FIG. 1A.

At the decision 704 of the process 700, the SMS response evaluation component 120 may determine whether a record (e.g., an action opportunity record) exists in the data store 122 for the phone number (or other identifier of the customer device 102) from which the SMS response originated. The SMS response evaluation component 120 may make such a determination, for example, by querying the data store 122 for records corresponding to the phone number in question. As indicated, when the SMS response evaluation component 120 determines that a record (e.g., an action opportunity record) for the phone number exists in the data store 122, the process may proceed to the decision 706. When on the other hand, the SMS response evaluation component 120 determines (at the step 704) that a record (e.g., an action opportunity record) does not exist in the data store 122, the process 700 may instead proceed to a step 712, at which the SMS response evaluation component 120 may generate appropriate content for a reply SMS message, such as a message indicating that the system is unable to process the customer's request and suggesting that the customer use another medium, e.g., a key pad 208 or a mobile app to provide instructions to the system. As described above in connection with FIG. 1A, the SMS response evaluation component 120 may then instruct SMS message generation component 118 to generate and send a corresponding SMS reply message to the phone number that sent the response message (per the arrow 154). In some implementations, certain records in the data store 122 may be removed and/or marked as inactive for various reasons, e.g., based on their age, to manage how the SMS response evaluation component 120 responds to prompts that have become stale (e.g., were sent more than a threshold period of time in the past). For instance, in some implementations, any records in the data store 112 that more than two hours (or some other suitable period) old may be marked as inactive. In such cases, per the decision 704, the SMS response evaluation component 120 may query the data store 122 for only records (e.g., action opportunity records) that are currently indicated as being active.

At the decision 706 of the process 700, the SMS response evaluation component 120 may determine whether the content of the responsive SMS message unambiguously indicates an intent to control the system. For example, as described above in connection with FIG. 1A, in some implementations, the SMS response evaluation component 120 may determine that a clear intent to control the system (e.g., to take a disarm action, unlock a door, adjust a thermostat, etc.) exists only if it determines the responsive message contains a particular phrase, such as "Disarm now," that was also included in the prompt (e.g., as noted above, the SMS message for the prompt may state, "Would you like to disarm the SimpliSafe system at [address]? Reply with 'Disarm now.") The SMS response evaluation component 120 may make such a determination, for example, by comparing the text of the responsive message with the particular phrase that was included in the prompt to see whether matching text is present in the responsive message. In some implementations, the SMS response evaluation component 120 may determine matching text to be present only if the responsive message includes text that is an exact match for the particular phrase, but perhaps allowing variation of the case (e.g., uppercase versus lower case letters) between the text in the responsive message and the text of particular phrase included in the prompt.

As indicated in FIG. 7, when the SMS response evaluation component 120 determines (at the decision 706—e.g., as described above) that a clear intent to control the system is present, the process may proceed to the decision 708. When on the other hand, the SMS response evaluation component 120 determines (at the decision 706—e.g., as described above) that the intent to control the system is not sufficiently clear, the process 700 may instead proceed to a step 714, at which the SMS response evaluation component 120 may generate appropriate content for a reply SMS message, such as a message stating, "Invalid response. Reply 'Disarm now' to disarm." As described above in connection with FIG. 1A, the SMS response evaluation component 120 may then instruct SMS message generation component 118 to generate and send a corresponding SMS reply message to the phone number that sent the response message (per the arrow 154).

At the decision 708 of the process 700, the SMS response evaluation component 120 may determine whether the response was received within a predetermined, finite time window (e.g., thirty minutes) following the sending of the prompt and/or following the occurrence of the event (e.g., cancelation of the alarm or system state change) that triggered the sending of such a prompt. The end point or boundaries of such a time window may be defined, for example, by the time window indicator 144 (see FIG. 1B) included an active record retrieved from the data store 122 for the phone number from which the SMS response originated. As indicated, when the SMS response evaluation component 120 determines, e.g., by evaluating a time stamp of the responsive SMS message against an expiration time indicated by the time window indicator 144, that the response was received within the predetermined, finite window of time, the process may proceed to the decision 710. When on the other hand, the SMS response evaluation component 120 determines (at the decision 708), e.g., by evaluating a time stamp of the responsive SMS message against an expiration time indicated by the time window indicator 144, that the SMS response was received outside of the specified time window (e.g., more than thirty minutes after the prompt was sent), the process 700 may instead proceed to a step 716, at which the SMS response evaluation component 120 may generate appropriate content for a reply SMS message, such as a message informing the user that the system can no longer be controlled in the requested manner via a text message.

At the decision 710 of the process 700, the SMS response evaluation component 120 may determine whether the user who sent the SMS response message is a primary contact for the location 202 to which the triggering event relates. As noted above in connection with FIG. 1A, this may involve evaluating the content of the record the SMS response evaluation component 120 retrieved from the data store 122 and/or using the phone number to retrieve additional data from the data store 112 or elsewhere relating to the customer's account. As illustrated in FIG. 7, when the SMS response evaluation component 120 verifies (per the decision 710) that the user associated with the phone number is a primary contact, the process 700 may proceed to a step 720, at which the SMS response evaluation component 120 may send a request to control the system 200 to the system state controller 108, as described in more detail below. When on the other hand, the SMS response evaluation component 120 determines (at the decision 710) that the user associated with the phone number is not a primary contact, the process 700 may instead proceed to a step 718, at which the SMS response evaluation component 120 may generate appropriate content for a reply SMS message, such as a message informing the user that they are not authorized to control the system in the manner requested via text message.

As indicated previously, at the step 720 of the process 700, the SMS response evaluation component 120 may send a request (e.g., per the arrow 130 in FIG. 1A) to control the system 200 to the system state controller 108. After sending such a request, the SMS response evaluation component 120 may wait for a response (e.g., per the arrow 160 in FIG. 1A) from the system state controller 108 indicating whether the system state controller 108 was able to successfully process the request and, if not, the reason for the failure.

When, at a decision 722 of the process 700, the SMS response evaluation component 120 determines that the response from the system state controller 108 indicates that the attempt to control the system could not be processed because, for example, the system is already in a disarmed state, the thermostat is already set to Eco mode, etc., the process 700 may proceed to a step 724, at which the SMS response evaluation component 120 may generate appropriate content for a reply SMS message, such as a message stating, "System already disarmed" or "Thermostat already set to Eco mode", etc. As described above in connection with FIG. 1A, the SMS response evaluation component 120 may then instruct SMS message generation component 118 to generate and send a corresponding SMS reply message to the acting contact, i.e., the phone number from which the response message originated.

When, at the decision 722, the SMS response evaluation component 120 determines that the response from the system state controller 108 indicates that the attempt to control the system failed for some other reason, the process 700 may instead proceed to steps 726 and 728, at which the at which the SMS response evaluation component 120 may generate appropriate content for reply SMS messages to be sent to the acting contact as well as other primary contacts for the location 202 to which the triggering event (e.g., the canceling of an alarm, the arming of a security system, etc.) relates. For example, per the step 726, the SMS response evaluation component 120 may generate, for example, content for a message for the acting contact indicating, "System already disarmed," and per the step 728, the SMS response evaluation component 120 may in some examples generate content for a message to the other primary contacts indicating, "A primary contact attempted to disarm, but their attempt was unsuccessful. Please try disarming by app, Keypad, or Key Fob."

When, at the decision 722, the SMS response evaluation component 120 determines that the response from the system state controller 108 indicates that the attempt to control the system was successful, the process 700 may proceed to steps 730 and 732, at which the at which the SMS response evaluation component 120 may generate appropriate content for reply SMS messages to be sent to the acting contact as well as other primary contacts for the location 202 to which the triggering event (e.g., the canceling of an alarm, the arming of a security system, etc.) relates. For example, per the step 730, the SMS response evaluation component 120 may, in some examples, generate content for a message for the acting contact indicating, "System disarmed," and per the step 732, the SMS response evaluation component 120 may, in some examples, generate content for a message to the other primary contacts indicating, "The system was disarmed by [name]", with the "[name] field being populated to include the name of the acting contact who sent the SMS response requesting that the system be disarmed.

Finally, following any of the steps 724, 728 or 732, the process 700 may proceed to a step 734, at which the SMS response evaluation component 120 may create a timeline event for the location 202 indicating the event (or attempt), which event can be displayed to a user (e.g., via a mobile app), together with other events of interest, in a timeline format.

Figure 8:
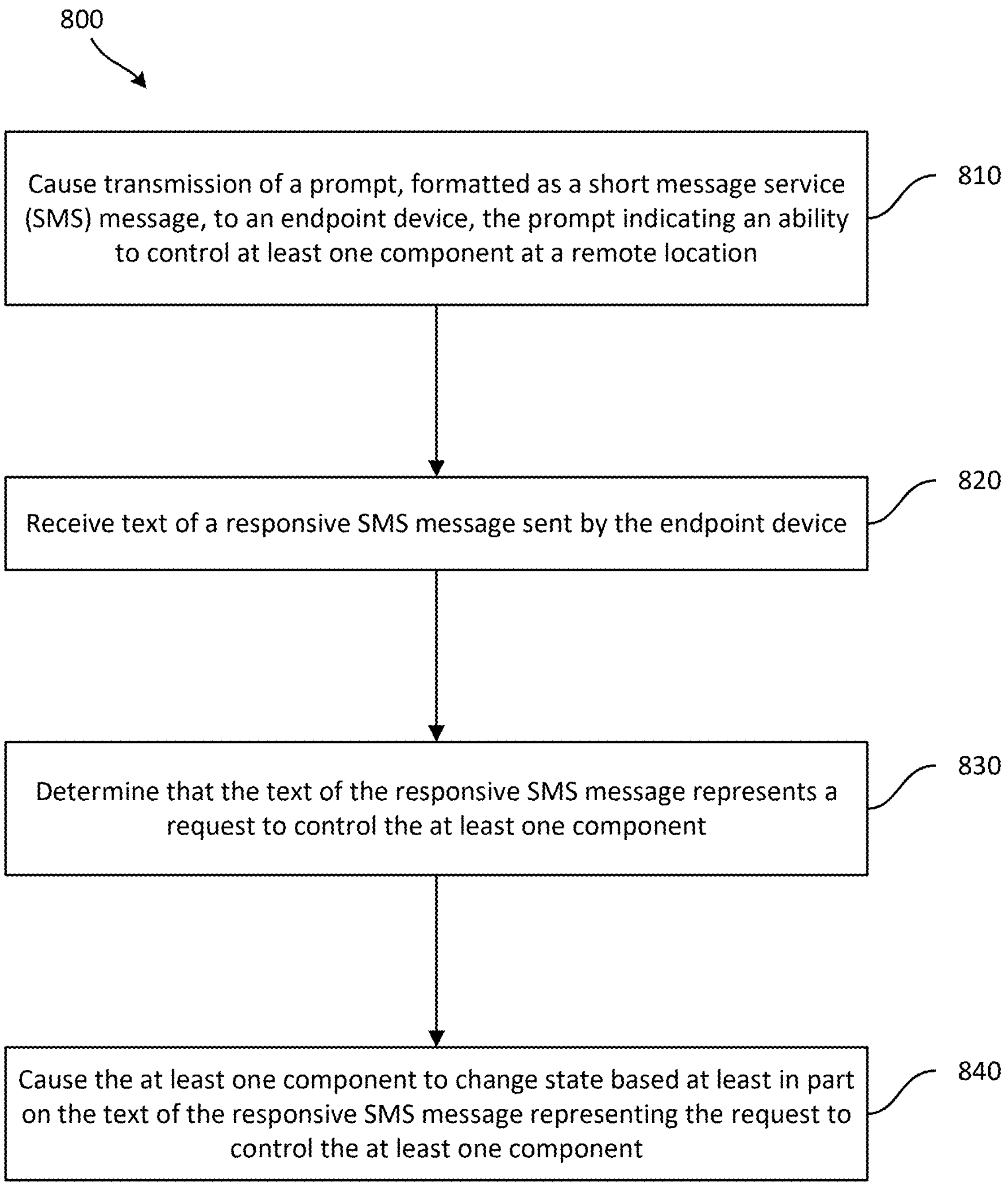
FIG. 8 is a flowchart showing an example method that may be performed by the SMS service shown in FIG. 1A, in accordance with some implementations of the present disclosure.

FIG. 8 is a flowchart of an example method 800 that may be performed by one or more components of the SMS service 104 shown in FIG. 1A.

At step 810 of the method 800, the SMS service 104 may cause transmission of a prompt, formatted as a short message service (SMS) message, to an endpoint device (e.g., the customer device 102), the prompt indicating an ability to control at least one component (e.g., to disarm a security system, to unlock a door, to adjust a thermostat, etc.) at location remote from the SMS service 104 (e.g., at a property 202 of the user of the customer device 102).

At step 820 of the method 800, the SMS service 104 may receive text of a responsive SMS message sent by the endpoint device (e.g., the customer device 102).

At step 830 of the method 800, the SMS service 104 may determine that the text of the responsive SMS message represents a request to control the at least one component.

At step 840 of the method 800, the SMS service 104 may cause the at least one component to change state (e.g., by sending an action request to the system state controller 108 per the arrow 130 in FIG. 1A) based at least in part on the text of the responsive SMS message representing the request to control the at least one component.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

The following clauses describe example implementations of the present disclosure. Other variations will be apparent in light of this disclosure.

Clause 1. A method, comprising: causing, by a computing system, transmission of a prompt, formatted as a short message service (SMS) message, to an endpoint device, the prompt indicating an ability to control at least one component at a location remote from the computing system; receiving, by the computing system, text of a responsive SMS message sent by the endpoint device; determining, by the computing system, that the text of the responsive SMS message represents a request to control the at least one component; and causing, by the computing system, the at least one component to change state based at least in part on the text of the responsive SMS message representing the request to control the at least one component.

Clause 2. The method of clause 1, further comprising: determining, by the computing system, that an alarm generated by a system including the at least one component been resolved based on data from a data store; and causing, by the computing system, transmission of the prompt based at least in part on resolution of the alarm.

Clause 3. The method of clause 2, further comprising: determining, by the computing system, that the alarm indicates burglary; wherein causing transmission of the prompt is in response to a determination that the alarm represents burglary.

Clause 4. The method of clause 2 or clause 3, further comprising: determining, by the computing system, that the responsive SMS message was received within a window of time following resolution of the alarm; wherein causing the at least one component to change state is further based at least in part on receipt of the responsive SMS message within the window of time.

Clause 5. The method of any of clauses 1-4, further comprising: determining, by the computing system, that the responsive SMS message was received within a finite window of time following transmission of the prompt; wherein causing the at least one component to change state is further based at least in part on receipt of the responsive SMS message within the finite window of time.

Clause 6. The method of any of clauses 1-5, further comprising: storing, by the computing system, a record of the prompt in a data store, the record including an identifier of the endpoint device; and determining, by the computing system, that the responsive SMS message included the identifier; wherein causing the at least one component to change state is further based at least in part on the record and the responsive SMS message both including the identifier.

Clause 7. The method of any of clauses 1-6, wherein causing the at least one component to change state includes sending, to a remote computing environment, a request to disarm a system including the at least one component.

Clause 8. The method of clause 7, further comprising: receiving, by the computing system and from the remote computing environment, an indication that the system has been disarmed; and in response to receipt of the indication, causing, by the computing system, transmission of a reply, formatted as an SMS message, to the endpoint device, the reply indicating that the system has been disarmed.

Clause 9. The method of any of clauses 1-8, further comprising: receiving, by the computing system, second text of another SMS message that represents a request to disarm a system including the at least one component; determining, by the computing system, the state of the system to be unarmed; and in response to the state of the system being unarmed, causing, by the computing system, transmission of a responsive communication, formatted as an SMS message, the responsive communication indicating that the system is already unarmed.

Clause 10. The method of any of clauses 1-9, further comprising: determining, by the computing system, that the text of the responsive SMS message represents the request to control the at least one component based on a determination that the text of the responsive SMS message matches text that was included in the prompt.

Clause 11. A computing system, comprising: one or more processors; and one or more computer-readable mediums encoded with instructions which, when executed by the one or more processors, cause the computing system to: cause transmission of a prompt, formatted as a short message service (SMS) message, to an endpoint device, the prompt indicating an ability to control at least one component at a location remote from the computing system; receive text of a responsive SMS message sent by the endpoint device; determine that the text of the responsive SMS message represents a request to control the at least one component; and cause the at least one component to change state based at least in part on the text of the responsive SMS message representing the request to control the at least one component.

Clause 12. The computing system of clause 11, wherein the one or more computer-readable mediums are encoded with additional instructions which, when executed by the one or more processors, further cause the computing system to: determine that an alarm generated by a system including the at least one component been resolved based on data from a data store; and cause transmission of the prompt based at least in part on resolution of the alarm.

Clause 13. The computing system of clause 12, wherein the one or more computer-readable mediums are encoded with additional instructions which, when executed by the one or more processors, further cause the computing system to: determine that the alarm indicates burglary; and cause transmission of the prompt in response to a determination that the alarm represents burglary.

Clause 14. The computing system of clause 12 or clause 13, wherein the one or more computer-readable mediums are encoded with additional instructions which, when executed by the one or more processors, further cause the computing system to: determine that the responsive SMS message was received within a window of time following resolution of the alarm; and cause the at least one component to change state further based at least in part on receipt of the responsive SMS message within the window of time.

Clause 15. The computing system of any of clauses 11-14, wherein the one or more computer-readable mediums are encoded with additional instructions which, when executed by the one or more processors, further cause the computing system to: determine that the responsive SMS message was received within a finite window of time following transmission of the prompt; and cause the at least one component to change state further based at least in part on receipt of the responsive SMS message within the finite window of time.

Clause 16. The computing system of any of clauses 11-15, wherein the one or more computer-readable mediums are encoded with additional instructions which, when executed by the one or more processors, further cause the computing system to: store a record of the prompt in a data store, the record including an identifier of the endpoint device; determine that the responsive SMS message included the identifier; and cause the at least one component to change state further based at least in part on the record and the responsive SMS message both including the identifier.

Clause 17. The computing system of any of clauses 11-16, wherein the one or more computer-readable mediums are encoded with additional instructions which, when executed by the one or more processors, further cause the computing system to cause the at least one component to change state at least in part by sending, to a remote computing environment, a request to disarm a system including the at least one component.

Clause 18. The computing system of clause 17, wherein the one or more computer-readable mediums are encoded with additional instructions which, when executed by the one or more processors, further cause the computing system to: receive, from the remote computing environment, an indication that the system has been disarmed; and in response to receipt of the indication, cause transmission of a reply, formatted as an SMS message, to the endpoint device, the reply indicating that the system has been disarmed.

Clause 19. The computing system of any of clauses 11-18, wherein the one or more computer-readable mediums are encoded with additional instructions which, when executed by the one or more processors, further cause the computing system to: receive second text of another SMS message that represents a request to disarm a system including the at least one component; determine the state of the system to be unarmed; and in response to the state of the system being unarmed, cause transmission of a responsive communication, formatted as an SMS message, the responsive communication indicating that the system is already unarmed.

Clause 20. The computing system any of clauses 11-19, wherein the one or more computer-readable mediums are encoded with additional instructions which, when executed by the one or more processors, further cause the computing system to: determine that the text of the responsive SMS message represents the request to control the at least one component based on a determination that the text of the responsive SMS message matches text that was included in the prompt.

Use of ordinal terms such as “first,” “second,” “third,” etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of “including,” “comprising,” “having,” “containing,” “involving,” and variations thereof is meant to encompass the items listed thereafter and equivalents thereof as well as additional items. References to “or” can be construed as inclusive so that any terms described using “or” can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:

causing, by a computing system, transmission of a prompt, formatted as a short message service (SMS) message, to an endpoint device, the prompt indicating an ability to control at least one component at a location remote from the computing system;

storing, by the computing system, a record of the prompt in a data store, the record including an identifier of the endpoint device;

receiving, by the computing system, text of a responsive SMS message sent by the endpoint device;

determining, by the computing system, that the responsive SMS message included the identifier;

determining, by the computing system, that the text of the responsive SMS message represents a request to control the at least one component; and causing, by the computing system, the at least one component to change state based at least in part on (i) the record and the responsive SMS message both including the identifier, and (ii) the text of the responsive SMS message representing the request to control the at least one component.

2. The method of claim 1, further comprising:

determining, by the computing system, that an alarm status for an alarm at the location indicates that the alarm has been resolved; and causing, by the computing system, transmission of the prompt based at least in part on the resolution of the alarm.

3. The method of claim 2, further comprising:

determining, by the computing system, that the alarm indicates burglary;

wherein causing transmission of the prompt is in response to a determination that the alarm represents burglary.

4. The method of claim 2, further comprising:

determining, by the computing system, that the responsive SMS message was received within a window of time following resolution of the alarm;

wherein causing the at least one component to change state is further based at least in part on receipt of the responsive SMS message within the window of time.

5. The method of claim 1, further comprising:

determining, by the computing system, that the responsive SMS message was received within a finite window of time following transmission of the prompt;

wherein causing the at least one component to change state is further based at least in part on receipt of the responsive SMS message within the finite window of time.

6. The method of claim 1, wherein causing the at least one component to change state includes sending, to a remote computing environment, a request to disarm a system including the at least one component.

7. The method of claim 6, further comprising:

receiving, by the computing system and from the remote computing environment, an indication that the system has been disarmed; and in response to receipt of the indication, causing, by the computing system, transmission of a reply, formatted as an SMS message, to the endpoint device, the reply indicating that the system has been disarmed.

8. The method of claim 1, further comprising:

receiving, by the computing system, second text of another SMS message that represents a request to disarm a system including the at least one component;

determining, by the computing system, the state of the system to be unarmed; and in response to the state of the system being unarmed, causing, by the computing system, transmission of a responsive communication, formatted as an SMS message, the responsive communication indicating that the system is already unarmed.

9. The method of claim 1, further comprising:

determining, by the computing system, that the text of the responsive SMS message represents the request to control the at least one component based on a determination that the text of the responsive SMS message matches text that was included in the prompt.

10. A computing system, comprising:

one or more processors; and one or more computer-readable mediums encoded with instructions which, when executed by the one or more processors, cause the computing system to:

cause transmission of a prompt, formatted as a short message service (SMS) message, to an endpoint device, the prompt indicating an ability to control at least one component at a location remote from the computing system;

store a record of the prompt in a data store, the record including an identifier of the endpoint device;

receive text of a responsive SMS message sent by the endpoint device;

determine that the responsive SMS message included the identifier;

determine that the text of the responsive SMS message represents a request to control the at least one component; and cause the at least one component to change state based at least in part on (i) the record and the responsive SMS message both including the identifier, and (ii) the text of the responsive SMS message representing the request to control the at least one component.

11. The computing system of claim 10, wherein the one or more computer-readable mediums are encoded with additional instructions which, when executed by the one or more processors, further cause the computing system to:

determine that an alarm status for an alarm at the location indicates that the alarm has been resolved; and cause transmission of the prompt based at least in part on the resolution of the alarm.

12. The computing system of claim 11, wherein the one or more computer-readable mediums are encoded with additional instructions which, when executed by the one or more processors, further cause the computing system to:

determine that the alarm indicates burglary; and cause transmission of the prompt in response to a determination that the alarm represents burglary.

13. The computing system of claim 11, wherein the one or more computer-readable mediums are encoded with additional instructions which, when executed by the one or more processors, further cause the computing system to:

determine that the responsive SMS message was received within a window of time following resolution of the alarm; and cause the at least one component to change state further based at least in part on receipt of the responsive SMS message within the window of time.

14. The computing system of claim 10, wherein the one or more computer-readable mediums are encoded with additional instructions which, when executed by the one or more processors, further cause the computing system to:

determine that the responsive SMS message was received within a finite window of time following transmission of the prompt; and cause the at least one component to change state further based at least in part on receipt of the responsive SMS message within the finite window of time.

15. The computing system of claim 10, wherein the one or more computer-readable mediums are encoded with additional instructions which, when executed by the one or more processors, further cause the computing system to cause the at least one component to change state at least in part by sending, to a remote computing environment, a request to disarm a system including the at least one component.

16. The computing system of claim 15, wherein the one or more computer-readable mediums are encoded with additional instructions which, when executed by the one or more processors, further cause the computing system to:

receive, from the remote computing environment, an indication that the system has been disarmed; and in response to receipt of the indication, cause transmission of a reply, formatted as an SMS message, to the endpoint device, the reply indicating that the system has been disarmed.

17. The computing system of claim 10, wherein the one or more computer-readable mediums are encoded with additional instructions which, when executed by the one or more processors, further cause the computing system to:

receive second text of another SMS message that represents a request to disarm a system including the at least one component;

determine the state of the system to be unarmed; and in response to the state of the system being unarmed, cause transmission of a responsive communication, formatted as an SMS message, the responsive communication indicating that the system is already unarmed.

18. The computing system of claim 10, wherein the one or more computer-readable mediums are encoded with additional instructions which, when executed by the one or more processors, further cause the computing system to:

determine that the text of the responsive SMS message represents the request to control the at least one component based on a determination that the text of the responsive SMS message matches text that was included in the prompt.

* * * * *